US007251632B1

(12) United States Patent
Ogg et al.

(10) Patent No.: US 7,251,632 B1
(45) Date of Patent: Jul. 31, 2007

(54) MACHINE DEPENDENT LOGIN FOR ON-LINE VALUE-BEARING ITEM SYSTEM

(75) Inventors: Craig L. Ogg, Long Beach, CA (US); Piers C. Lingle, Santa Monica, CA (US)

(73) Assignee: Stamps. com, Santa Monica, CA (US)

( * ) Notice: Subject to any disclaimer, the term of this patent is extended or adjusted under 35 U.S.C. 154(b) by 545 days.

(21) Appl. No.: 09/692,747

(22) Filed: Oct. 18, 2000

Related U.S. Application Data

(60) Provisional application No. 60/160,708, filed on Oct. 20, 1999, provisional application No. 60/160,491, filed on Oct. 20, 1999, provisional application No. 60/160,040, filed on Oct. 18, 1999, provisional application No. 60/160,038, filed on Oct. 18, 1999.

(51) Int. Cl.
*G06Q 99/00* (2006.01)
*G06Q 40/00* (2006.01)
*H04K 1/00* (2006.01)
*G06F 17/00* (2006.01)
*G07B 17/02* (2006.01)

(52) U.S. Cl. .............................. 705/62; 705/1; 705/50; 705/60; 705/401; 705/408

(58) Field of Classification Search .................... 705/1, 705/50, 51, 60, 62, 64, 400, 401, 408
See application file for complete search history.

(56) References Cited

U.S. PATENT DOCUMENTS 4,447,890 A 5/1984 Duwel et al. ............... 364/900
4,743,747 A 5/1988 Fougere et al. ............. 235/494
4,831,555 A 5/1989 Sansone et al.

(Continued)

FOREIGN PATENT DOCUMENTS

EP 690417 A2 * 1/1996

(Continued)

OTHER PUBLICATIONS

"Pitney Bowes Showcases Internet Messaging Solutions", Business Wire, Oct. 7, 1998.*

(Continued)

*Primary Examiner*—Calvin L. Hewitt, II
(74) *Attorney, Agent, or Firm*—Christie, Parker & Hale, LLP.

(57) ABSTRACT

An on-line VBI printing system that includes one or more cryptographic modules and a central database. The cryptographic modules are capable of implementing a variety of required security standards. A client system provides a user friendly GUI for facilitating the interface of the user to the system. The GUI system includes wizards that help the user step-by-step with processes of registration, logging into the system, and printing the VBI.

In one aspect, the invention describes an on-line system for printing a value bearing item (VBI) that includes a memory for storing information specific to a first computer used by the user for registering with the on-line system, wherein the information is used by the server system to identify the first computer and a re-registration wizard for requiring the user to re-register if a second computer used by the user is not the same as the first computer used for registering the user.

10 Claims, 15 Drawing Sheets

U.S. PATENT DOCUMENTS

| | | | | |
|---|---|---|---|---|
| 4,900,903 | A | 2/1990 | Wright et al. | |
| 4,900,904 | A | 2/1990 | Wright et al. | |
| 4,908,770 | A | 3/1990 | Breault et al. | |
| 5,111,030 | A | 5/1992 | Brasington et al. | |
| 5,181,245 | A | 1/1993 | Jones | 380/23 |
| 5,341,505 | A | 8/1994 | Whitehouse | 395/800 |
| 5,454,038 | A | 9/1995 | Cordery et al. | |
| 5,488,423 | A * | 1/1996 | Walkingshaw et al. | 725/24 |
| 5,684,951 | A | 11/1997 | Goldman et al. | 395/188.01 |
| 5,742,683 | A | 4/1998 | Lee et al. | 380/23 |
| 5,815,577 | A * | 9/1998 | Clark | 380/52 |
| 5,825,893 | A | 10/1998 | Kara | 380/51 |
| 5,930,796 | A | 7/1999 | Pierce et al. | 707/100 |
| 5,983,227 | A | 11/1999 | Nazem et al. | 707/10 |
| 6,064,993 | A | 5/2000 | Ryan, Jr. | 705/403 |
| 6,223,166 | B1 * | 4/2001 | Kay | 705/26 |
| 6,233,565 | B1 * | 5/2001 | Lewis et al. | 705/35 |
| 6,408,286 | B1 * | 6/2002 | Heiden | 705/408 |
| 6,421,768 | B1 * | 7/2002 | Purpura | 711/164 |
| 6,438,530 | B1 * | 8/2002 | Heiden et al. | 705/401 |
| 6,581,162 | B1 * | 6/2003 | Angelo et al. | 713/193 |

FOREIGN PATENT DOCUMENTS

| | | |
|---|---|---|
| EP | 0 854 448 | 7/1998 |
| EP | 0 927 958 | 7/1999 |
| GB | 2 318 486 | 4/1988 |
| WO | WO 94/27258 | 11/1994 |
| WO | WO 98/51029 | 11/1998 |
| WO | WO 98/57302 | 12/1998 |
| WO | WO 98/57460 | 12/1998 |

OTHER PUBLICATIONS

U.S. Appl. No. 09/690,066, filed Oct. 16, 2000, "Cryptographic Module for Secure Processing of Value-Bearing Items", 121pp.

U.S. Appl. No. 10/083,236, filed Feb. 26, 2002, "Secured Centralized Public Key Infrastructure", 101pp.

United States Postal Service, "Information-Based Indicia Program (IBIP), Performance Criteria for Information-Based Indicia and Security Architecture for Closed IBI Postage Metering Systems", XP-002138350, Entire Document (49 pgs.), Jan. 1999.

* cited by examiner

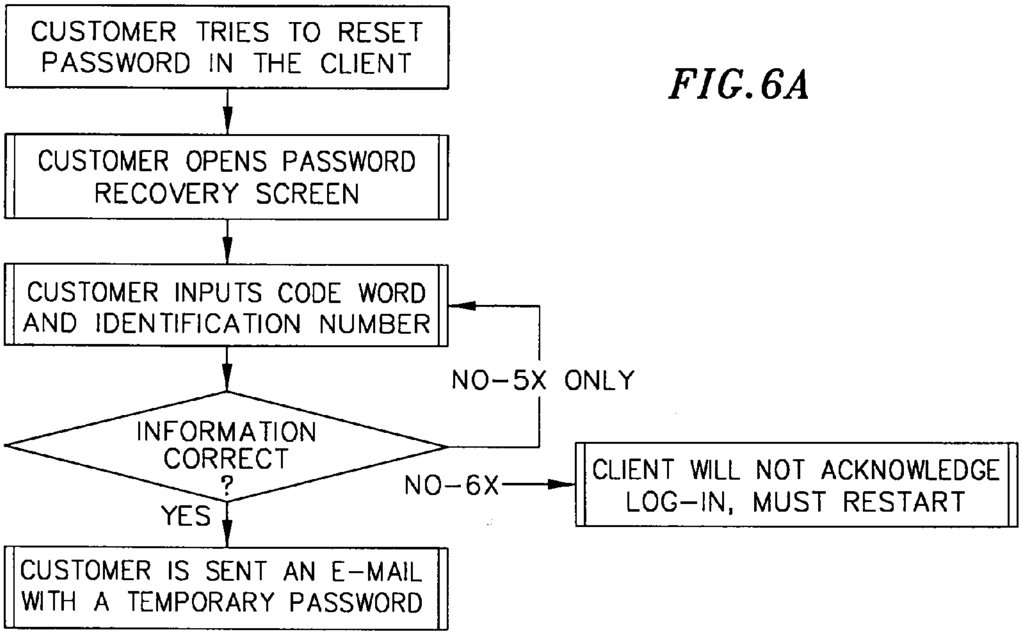
FIG. 6A
FIG. 6B
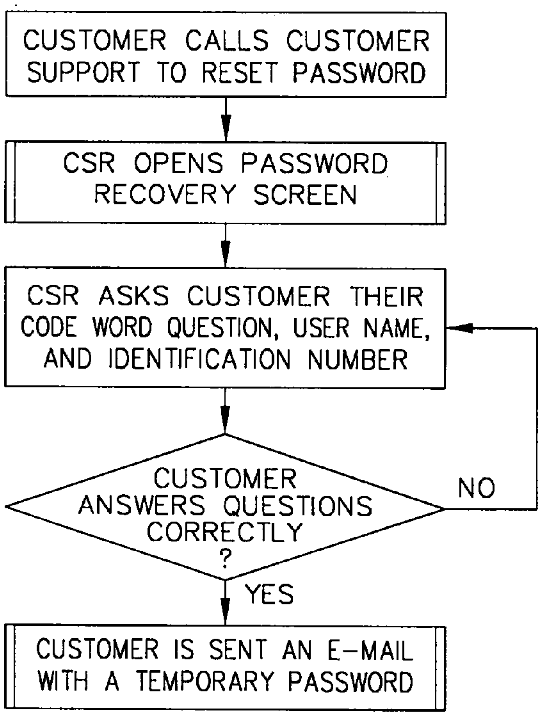

MACHINE DEPENDENT LOGIN FOR ON-LINE VALUE-BEARING ITEM SYSTEM

CROSS-REFERENCE TO RELATED APPLICATIONS

This patent application claims the benefit of the filing date of U.S. Provisional Patent Application Ser. Nos. 60/160,040, filed Oct. 18, 1999 and entitled "MACHINE DEPENDENT LOGIN FOR ON-LINE POSTAGE SYSTEM"; and 60/160,038, filed Oct. 18, 1999 and entitled "METHOD AND APPARATUS FOR DIGITALLY SIGNING AN ADVERTISEMENT AREA ON VALUE BEARING ITEMS," and 60/160,491, filed Oct. 20, 1999 and entitled "SECURE AND RECOVERABLE DATABASE FOR ON-LINE POSTAGE SYSTEM"; and 60/160,708, filed Oct. 20, 1999 and entitled "MACHINE DEPENDENT LOGIN FOR ON-LINE POSTAGE SYSTEM"; the entire contents of which are hereby expressly incorporated by reference.

FIELD OF THE INVENTION

The present invention relates to secure printing of value-bearing items (VBI) preferably, such as postage, tickets, and coupons. More specifically, the invention relates to a graphical user interface (GUI) for logging into the system, recovering a password, and printing of VBI in a computer network environment.

BACKGROUND OF THE INVENTION

A considerable percentage of the United States Postal Service (USPS) revenue is from metered postage. Metered postage is generated by utilizing postage meters that print a special mark, also known as postal indicia, on mail pieces. Generally, printing postage and any VBI can be carried out by using mechanical meters or computer-based systems.

With respect to computer-based postage processing systems, the USPS under the Information-Based Indicia Program (IBIP) has published specifications for IBIP postage meters that identify a special purpose hardware device, known as a Postal Security Device (PSD) that is generally located at a user's site. The PSD, in conjunction with the user's personal computer and printer, functions as the IBIP postage meter. The USPS has published a number of documents describing the PSD specifications, the indicia specifications and other related and relevant information. There are also security standards for printing other types of VBIs, such as coupons, tickets, gift certificates, currency, voucher and the like.

A significant drawback of existing hardware-based systems is that a new PSD must be locally provided to each new user, which involves significant cost. Furthermore, if the additional PSD breaks down, service calls must be made to the user location. In light of the drawbacks in hardware-based postage metering systems, a software-based system has been developed that does not require specialized hardware for each user. The software-based system meets the IBIP specifications for a PSD, using a centralized server-based implementation of PSDs utilizing one or more cryptographic modules. The system also includes a database for all users' information. The software-based system, however, has brought about new challenges.

The system should also be able to handle minor and catastrophic database failures without impacting the integrity of the on-line VBI system and provide for recovery of the database to minimize or eliminate the loss of data. In a hardware-based system, security is generally handled by the local hardware piece, that is unique to each user and includes a cryptographic module that encrypts that user's information. System recovery can generally be handled by replacing the corrupted local hardware pieces for each user that stores that user's information, however, data specific to that user may be lost. Nevertheless, for a software-based system, the system need to be configured to handle such database failures without sacrificing a major data loss and system security.

Therefore, there is a need for a new method and apparatus for implementation of VBI printing via a user friendly GUI with a variety of selectable options.

SUMMARY OF THE INVENTION

In accordance with one aspect of the present invention, an on-line VBI printing system that includes one or more cryptographic modules and a database has been designed. The cryptographic modules serve the function of the PSDs and are capable of implementing a variety of required security standards. A client system provides a user friendly GUI for facilitating the interface of the user to the system. The GUI system includes wizards that help the user step-by-step with processes of registration, logging into the system, password recovery, and printing a VBI.

In one embodiment, the invention discloses an on-line system for providing an early warning to a user that has changed his/her computer (machine). The invention protects the user against someone else using the user's information and logging into the system on a different computer. In one aspect, the invention describes an on-line system for printing a value bearing item (VBI) comprising: a user using one or more computers connected to a computer network; a secret key for identifying a first computer used by the user for registering with the on-line system; a server system capable of communicating with the one or more user computers over the computer network for receiving user information and the secret key from the first computer and registering a user; and a re-registration wizard for requiring the user to re-register if a second computer used by the user is not the same as the first computer used for registering the user.

In another aspect, the invention describes an on-line system for printing a value bearing item (VBI) comprising: a user using one or more computers connected to a computer network; a memory for storing information specific to a first computer used by the user for registering with the on-line system, wherein the information is used by the server system to identify the first computer; a server system capable of communicating with the one or more user computers over the computer network for receiving user information and the computer information from the first computer; and a re-registration wizard for requiring the user to re-register if a second computer used by the user is not the same as the first computer used for registering the user. The information specific to the user computer include one or more of register settings, a processor's ID, machine configuration, a network card ID, and a user's private key.

It is to be understood that the present invention is useful for printing not only postage, but any value bearing items, such as coupons, tickets, gift certificates, currency, voucher and the like.

BRIEF DESCRIPTION OF THE DRAWINGS

The objects, advantages and features of this invention will become more apparent from a consideration of the following detailed description and the drawings, in which:

FIGS. 6A–6C are exemplary flow process diagrams for password recovery according to some embodiments of the present invention;

DETAILED DESCRIPTION

In one aspect, the system and method of the present invention prevent unauthorized electronic access to a database subsystem and secure customers' related data, among others. One level of security is achieved by protecting the database subsystem by a postal server subsystem. The postal server subsystem controls preferably, all communications with the database subsystem by executing an authentication algorithm to prevent unauthorized access.

Another level of security is achieved by encrypting preferably, all communications between the client system and the postal server subsystem. The encryption-decryption function is employed using commonly known algorithms, such as, Rivest, Shamir and Adleman ("RSA") public key encryption, DES, Triple-DES, Pseudo-random number generation, and the like algorithms. Additionally, DSA signature, and SHA-1 hashing algorithms may be used to digitally sign a postage indicium. Another level of security is provided when a user attempts to launch the client software from a different computer. In such a case, the client software detects that an encrypted user key that is stored on the user's machine is missing, and starts the re-registration process.

An exemplary on-line postage system is described in U.S. patent application Ser. No. 09/163,993 filed Sep. 15, 1998, the entire contents of which are hereby incorporated by reference herein. The on-line postage system includes an e protocol that operates in conjunction with the USPS requirements. The system utilizes on-line postage system software comprising user code that resides on a client system and controller code that resides on a server system. The on-line postage system allows a user to print a postal indicium at home, at the office, or any other desired place in a secure, convenient, inexpensive and fraud-free manner. The system comprises a user system electronically connected to a server system, which in turn is connected to a USPS system.

Each of the cryptographic modules may be available for use by any user. When a user requests a PSD service, one of the available modules is loaded with data belonging to the user's account and the transaction is performed. When a module is loaded with a user's data, that module becomes the user's PSD. The database record containing each user's PSD data is referred to as the "PSD package" (security device transaction data) After each PSD transaction is completed, the user's PSD package is updated and returned to a database external to the module. The database becomes an extension of the module's memory and stores not only the items specified by the IBIP for storage inside the PSD, but also the user's personal cryptographic keys and other security relevant data items (SRDI) and status information needed for continuous operation. Movement of this sensitive data between the modules and the database is secured to ensure that PSD packages could not be compromised.

Figure 1:
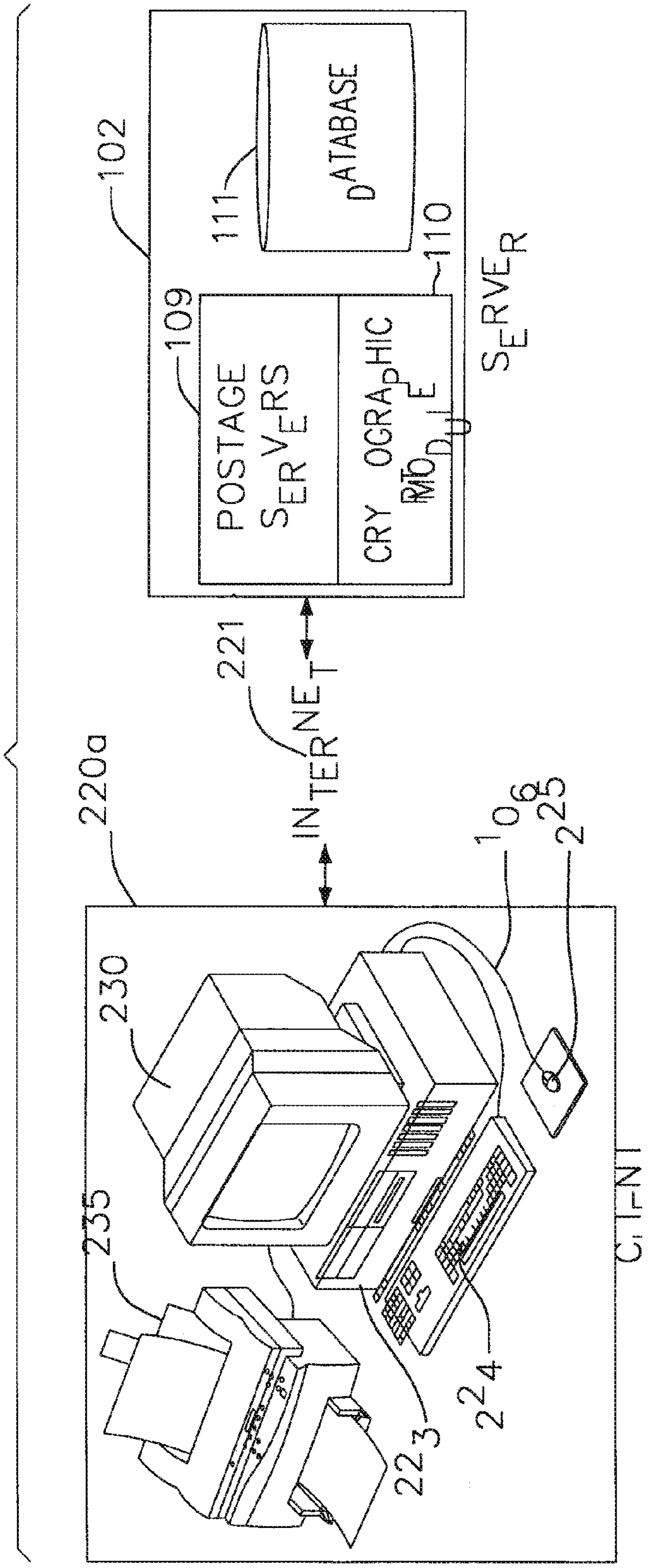
FIG. 1 is a block diagram for the client/server architecture according to one embodiment of the present invention.

In one embodiment, the server system is remotely located in a separate location from the client system. All communications between the client and the server are preferably accomplished via the Internet. FIG. 1 illustrates a remote client system 220*a* connected to a server system 102 via the Internet 221. The client system includes a processor unit 223, a monitor 230, printer port 106, a mouse 225, a printer 235, and a keyboard 224. Server system 102 includes Postage servers 109, Database 130, and cryptographic modules 110.

An increase in the number of servers within the server system 102 will not negatively impact the performance of the system, since the system design allows for scalability. The Server system 102 is designed in such a way that all of the business transactions are processed in the servers and not in the database. By locating the transaction processing in the servers, increases in the number of transactions can be easily handled by adding additional servers. Also, each transaction processed in the servers is stateless, meaning the application does not remember the specific hardware device the last transaction utilized. Because of this stateless transaction design, multiple servers can be added to each appropriate subsystem in order to handle increased loads.

Furthermore, each cryptographic module is a stateless device, meaning that a PSD package can be passed to any device because the application does not rely upon any information about what occurred with the previous PSD package. Therefore, multiple cryptographic modules can also be added to each appropriate subsystem in order to handle increased loads. A PSD package for each cryptographic module is a database record, stored in the server database, that includes information pertaining to one customer's service that would normally be protected inside a cryptographic module. The PSD package includes all data needed to restore the PSD to its last known state when it is next loaded into a cryptographic module. This includes the items that the IBIP specifications require to be stored inside the PSD, information required to return the PSD to a valid state when the record is reloaded from the database, and data needed for record security and administrative purposes.

In one embodiment, the items included in a PSD package include ascending and descending registers (the ascending register "AR" records the amount of postage that is dispensed or printed on each transaction and the descending register "DR" records the value or amount of postage that may be dispensed and decreases from an original or charged amount as postage is printed.), device ID, indicia key certificate serial number, licensing ZIP code, key token for the indicia signing key, the user secrets, key for encrypting user secrets, data and time of last transaction, the last challenge received from the client, the operational state of the PSD, expiration dates for keys, the passphrase repetition list and the like.

As a result, the need for specific PSDs being attached to specific cryptographic modules is eliminated. A Postal Server subsystem provides cryptographic module management services that allow multiple cryptographic modules to exist and function on one server, so additional cryptographic modules can easily be installed on a server.

Referring back to FIG. 1, Postage servers 109 include one or more Postal servers and provide indicia creation, account maintenance, and revenue protection functionality for the exemplary on-line postage system. The Postage servers 109 may include several physical servers in several distinct logical groupings, or services as described below. The individual servers could be located within one facility, or in several facilities, physically separated by great distance but connected by secure communication links.

Cryptographic modules 110 are responsible for creating PSDs and manipulating PSD data to protect sensitive information from disclosure, generating the cryptographic components of the digital indicia, and securely adjusting the user registration. When a user wishes to print VBI, for example, postage or purchase additional VBI or postage value, a user state is instantiated in the PSD implemented within one of the cryptographic modules 110. Database 111 includes all the data accessible on-line for indicia creation, account maintenance, and revenue protection processes. Postage servers 109, Database 130, and cryptographic modules 110 are maintained in a physically secured environment, such as a vault.

Figure 2:
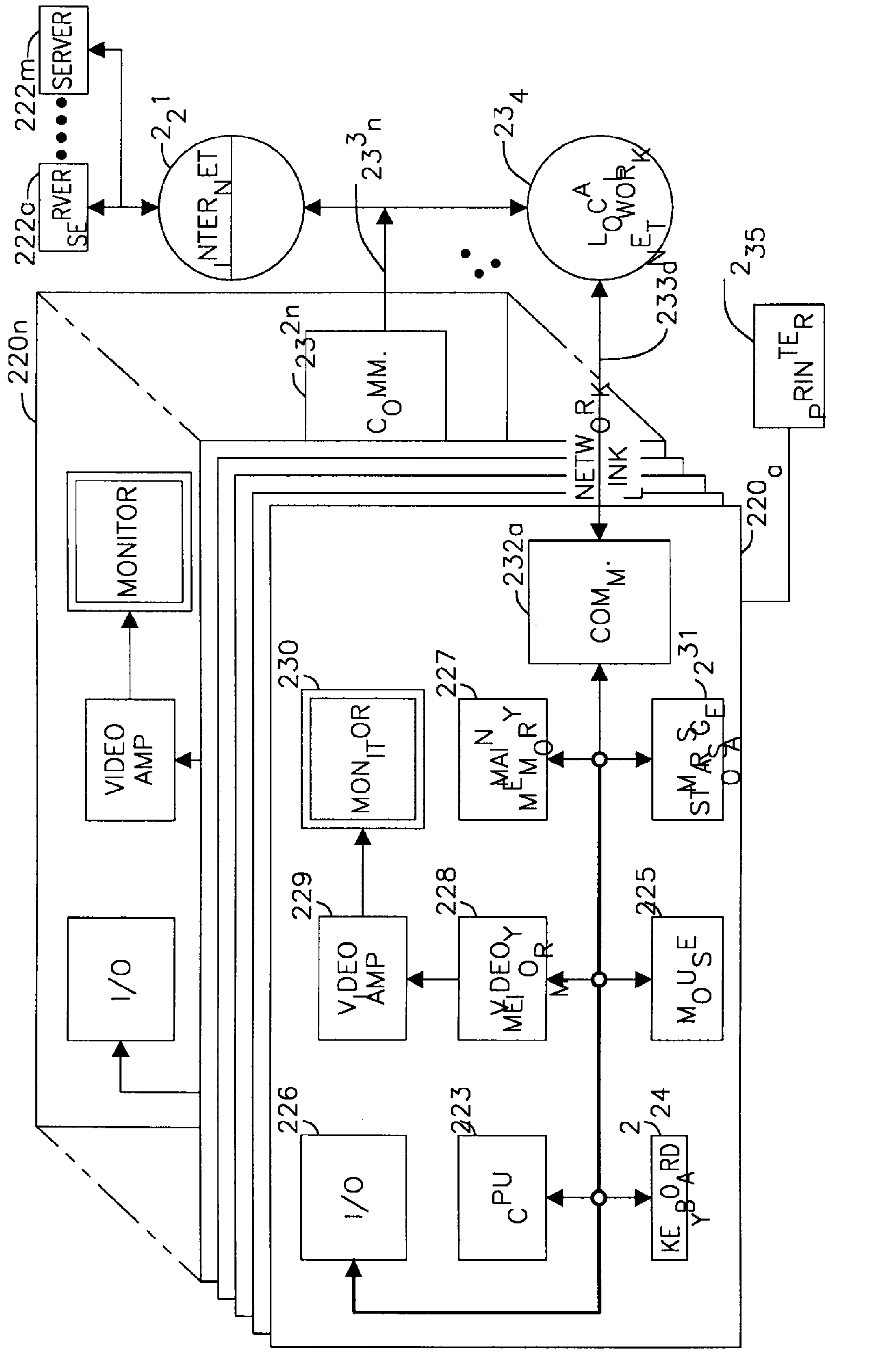
FIG. 2 is a block diagram of a remote user computer connected to a server via Internet according to one embodiment of the present invention.

FIG. 2 shows a simplified system block diagram of a typical Internet client/server environment used by an on-line VBI system in one embodiment of the present invention. PCs 220*a*–220*n* used by the postage purchasers are connected to the Internet 221 through the communication links 233*a*–233*n*. Each PC has access to one or more printers 235. Optionally, as is well understood in the art, a local network 234 may serve as the connection between some of the PCs, such as the PC 220*a* and the Internet 221 or other connections. Servers 222*a*–222*m* are also connected to the Internet 221 through respective communication links. Servers 222*a*–222*m* include information and databases accessible by PCs 220*a*–220*n*. The on-line VBI system of the present invention resides on one or more of Servers 222*a*–222*m*.

In this embodiment, each client system 220*a*–220*m* includes a CPU 223, a keyboard 224, a mouse 225, a mass storage device 231, main computer memory 227, video memory 228, a communication interface 232*a*, and an input/output device 226 coupled and interacting via a communication bus. The data and images to be displayed on the monitor 230 are transferred first from the video memory 228 to the video amplifier 229 and then to the monitor 230. The communication interface 232*a* communicates with the servers 222*a*–222*m* via a network link 233*a*. The network link connects the client system to a local network 234. The local network 234 communicates with the Internet 221.

In one embodiment, a customer (user), preferably licensed by the USPS and registered with an IBIP vendor (such as Stamps.com), sends a request for authorization to print a desired amount of VBI, such as postage. The server system verifies that the user's account holds sufficient funds to cover the requested amount of postage, and if so, grants the request. The server then sends authorization to the client system. The client system then sends image information for printing of a postal indicium for the granted amount to a printer so that the postal indicium is printed on an envelope or label.

In one embodiment, when a client system sends a VBI print request to the server system, the request needs to be authenticated before the client system is allowed to print the VBI, and while the VBI is being printed. The request is cryptographically authenticated using an authentication code. The client system sends a password (or passphrase) entered by a user to the server for verification. If the password fails, a preferably asynchronous dynamic password verification method terminates the session and printing of the VBI is aborted. Also, the server system communicates with a system located at a certification authority for verification and authentication purposes.

In one embodiment, the information processing components of the on-line VBI system include a client system, a postage server system located in a highly secure facility, a USPS system and the Internet as the communication medium among those systems. The information processing equipment communicates over a secured communication line.

Preferably, the security and authenticity of the information communicated among the systems are accomplished on a software level through the built-in features of a Secured Socket Layer (SSL) Internet communication protocol. An encryption hardware module embedded in the server system is also used to secure information as it is processed by the secure system and to ensure authenticity and legitimacy of requests made and granted.

The on-line VBI system is based on a client/server architecture. Generally, in a system based on client/server architecture the server system delivers information to the client system. That is, the client system requests the services of a generally larger computer. In one embodiment, the client is a local personal computer and the server is a more powerful group of computers that house the information. The connection from the client to the server is made via a Local Area Network, a phone line or a TCP/IP based WAN on the Internet or any other types of communication links such as wireless or satellite links. A primary reason to set up a client/server network is to allow many clients access to the same applications and files stored on the server system.

The on-line VBI system does not require any special purpose hardware for the client system. The client system is implemented in the form of software that can be executed on a user computer (client system) allowing the user computer to function as a virtual VBI meter. The software can only be executed for the purpose of printing the VBI indicia when the user computer is in communication with a server computer located, for example, at a VBI meter vendor's facility (server system). The server system is capable of communicating with one or more client systems simultaneously.

Figure 3:
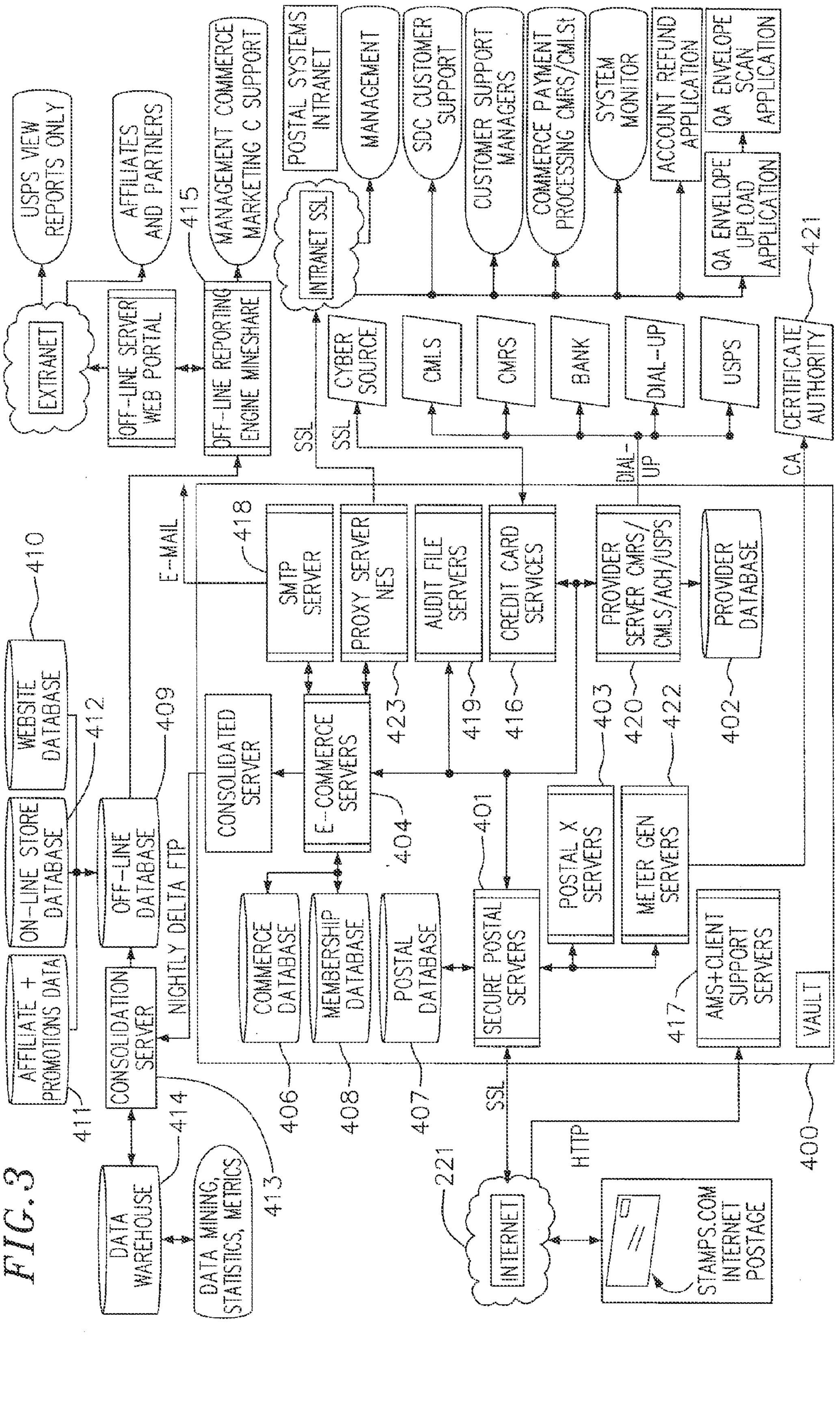
FIG. 3 is a block diagram of servers, databases, and services provided by according to one embodiment of the present invention.

In one embodiment, the on-line system includes the following subsystems: the Database subsystem, the Postal Server subsystem, the Provider Server subsystem, the E-commerce subsystem, the Staging subsystem, the Client Support subsystem, the Decision Support subsystem, the SMTP subsystem, the Address Matching service (AMS) subsystem, the SSL Proxy Server subsystem and the Web Server subsystem, and the like, as shown in FIG. 3.

Postage servers 109 in FIG. 1 include a string of servers connected to the Internet, for example, through a T1 line, and are preferably protected by a firewall. The firewall permits a client to communicate with a server system, only if the information packet transmitted by the client system complies with a security policy set by the server system. The services provided by the different subsystems of the on-line VBI system are designed to allow flexibility and expansion and reduce specific hardware dependency.

In one embodiment, the Database subsystem is comprised of multiple databases, as shown in FIG. 3. In this embodiment, the Database 411 includes the Affiliate DBMS and the Source IDs DBMS. The Affiliate DBMS manages affiliate information (e.g., affiliate's name, phone number, and affiliate's Website information) that is stored on the Affiliate Database. Using the data from this database, marketing and business reports are generated. The Source IDs Database contains information about the incoming links to the vendor's Website (e.g., partners' information, what services the vendor offers, what marketing program is associated with the incoming links, and co-branding information). Using the data from this database, marketing and business reports are generated.

The Online Store Database 412 contains commerce product information, working orders, billing information, password reset table, and other marketing related information. Website database 410 keeps track of user accesses to the vendor website. This database keeps track of user who access the vendor website, users who are downloading information and programs, and the links from which users access the vendor website. After storing these data on the Website Database 410, software tools are used to generate the following information:

Web Site Status
Web Site Reports
Form Results
Download Successes
Signup, Downloads, and Demographic Graphs
Web Server Statistics (Analog)
Web Server Statistics (Web Analyzer)

Offline database 409 manages the VBI data (except meter information), postal transactions data, financial transactions data (e.g., credit card purchases, free postage issued, bill credits, and bill debits), customer marketing information, commerce product information, meter license information, meter resets, meter history, and meter movement information. Consolidation Server 413 acts as a repository for data, centralizing data for easy transportation outside the vault 400. The Consolidation Server hosts both file and database services, allowing both dumps of activity logs and reports as well as a consolidation point for all database data.

The Offline Reporting Engine MineShare Server 415 performs extraction transformation from the holding database that received transaction data from the Consolidated Database (Commerce database 406, Membership database 408, and Postal Database 407). Also, the Offline Reporting Engine MineShare Server handles some administrative tasks. Transaction data in the holding database contains the transaction information about meter licensing information, meter reset information, postage purchase transactions, and credit card transactions. After performing extraction transformation, business logic data are stored on Offline Database 409. Transaction reports are generated using the data on the Offline Database. Transaction reports contain marketing and business information.

The Data Warehouse database 414 of FIG. 3 includes all customer information, financial transactions, and aggregated information for marketing queries (e.g., how many customers have purchased postage). In one embodiment, commerce Database 406 includes a Payment Database, an E-mail Database, and a Stamp Mart Database. The E-mail DBMS manages access to the contents of e-mail that were sent out to everyone by vendor servers. The Stamp Mart database handles order form processing. The E-commerce Server 404 provides e-commerce related services on a user/group permission basis. It provides commerce-related services such as payment processing, pricing plan support and billing as well as customer care functionality and LDAP membership personalization services.

A Credit Card Service is invoked by the E-commerce Server 404 to authorize and capture funds from the customer's credit card account and to transfer them to the vendor's merchant bank. A Billing Service is used to provide bills through e-mail to customers based on selected billing plans An ACH service runs automatically at a configurable time. It retrieves all pending ACH requests and batches them to be sent to bank for postage purchases (i.e. money destined for the USPS), or Chase for fee payments which is destined for the vendor account.

The E-commerce DBMS 406 manages access to the vendor specific Payment, Credit Card, and E-mail Databases. A Membership DBMS manages access to the LDAP membership directory database 408 that hosts specific customer information and customer membership data. A Postal DBMS manages access to the Postal Database 407 where USPS specific data such as meter and licensing information are stored. A Postal Server 401 provides secure services to the Client, including client authentication, postage purchase, and indicia generation. The Postal Server requires cryptographic modules to perform all functions that involve client authentication, postage purchase, and indicia generation.

Postal Transaction Server 403 provides business logic for postal functions such as device authorization and postage purchase/register manipulation. The Postal Transaction Server requires the cryptographic modules to perform all functions. There are four Client Support Servers. Address Matching Server (AMS) 417 verifies the correct address specified by a user. When the user enters a delivery address or a return address using the Client Software, the user does not need the address matching database on the user's local machine to verify the accuracy of the address. The Client software connects to the vendor's server and uses the central address database obtained from the USPS to verify the accuracy of the address. If the address is incorrect, the client software provides the user with a prioritized list of addresses to match the correct address. These choices are ranked in a user definable order. This information is represented using a plain text format.

The Client Support Servers 417 of FIG. 3 provides the following services: a Pricing Plan service, an Auto Update service, and a Printer Config service. The Pricing Plan Service provides information on pricing plans and payment methods available to the user. It also provides what credit cards are supported and whether ACH is supported. This information is represented preferably using a plain text format. The Auto Update Service verifies whether the user is running the latest Client Software. If there is newer Client Software, the Auto Update Server downloads the new patches to the user computer. The Client Support Database has tables for the client software update information. This information is represented using a plain text format.

Before the user tries to print postage, the user sends his or her printer driver information over the Internet in plain text. The Printer Config Service looks up the printer driver information in the Printer Driver Database to determine whether the printer driver is supported or not. When the user tries to configure the printer, the user prints a test envelope to test whether the postage printing is working properly or not. This testing envelope information is sent over the Internet in plain text and is stored in the Client Support Database.

MeterGen server 422 makes calls into the cryptographic module to create sufficient meters to ensure that the vendor can meet customer acquisition demands. SMTP Server 418 communicates with other SMTP servers, and it is used to forward e-mail to users. Gatekeeper Server works as a proxy server by handling the security and authentication validation for the smart card users to access customer and administration information that reside in the vault.

The Proxy Server 423 uses the Netscape™ Enterprise SSL library to provide a secure connection to the vault 400. Audit File Server 419 acts as a repository for module transaction logs. The Audit File Server verifies the audit logs that are digitally signed. The audit logs are verified in real time as they are being created. Postal Server writes audit logs to a shared hard drive on the Audit File Server. After these logs are verified, the Audit File Server preferably moves them from the shared hard drive to a hard drive that is not shared by any of the vendor servers.

Provider Server provides reporting and external communication functionality including the following services. CMLS Service forwards license applications and it processes responses from CMLS. The CMLS Service uses cryptographic functions provided by the Stamps.com Crypt library to decrypt the user's SSN/Tax ID/Employee ID. CMRS Service reports meter movement and resetting to the USPS Computerized Meter Resetting infrastructure. ACH Service is responsible for submitting ACH postage purchase requests to the USPS lockbox account at the bank. The CMLS Service uses cryptographic functions to decrypt the user's ACH account number.

After decrypting ACH account information, the ACH is encrypted using the vendor's script library. Then, the encrypted ACH file is e-mailed to the Commerce Group by the SMTP server. When the Commerce Group receives this encrypted e-mail, the vendor's Decrypt utility application is used to decrypt the ACH e-mail. After verifying the ACH information, the Commerce Group sends the ACH information through an encrypted device first and then uses a modem to upload the ACH information to a proper bank. The Certificate Authority issues certificates for all IBIP meters. The certificates are basically used to provide authentication for indicia produced by their respective meters.

The following are exemplary steps describing the certificate authorization process:

- MeterGen asks the module to create a meter package,
- The module returns a package and the meter's public key,
- MeterGen creates a certificate request with the public key, signs the request with a USPS-issued smartcard, and submits the request to the USPS Certificate Authority,
- The Certificate Authority verifies the request came from the vendor then, it creates a new certificate and returns it to MeterGen,
- MeterGen verifies the certificate using the USPS Certificate Authority's certificate (e.g., to ensure it wasn't forged) and stores the certificate information in the package. The package is now ready to be associated with a customer.

The Postal Server subsystem 401 of FIG. 3 manages client and remote administration access to server functionality, authenticates clients and allows clients to establish a secure connection to the on-line VBI system. The Postal Server subsystem also manages access to USPS specific data such as PSD information and a user's license information. The Postal Server subsystem queries the Postal portion of the Database subsystem for the necessary information to complete the task. The query travels through the firewall to the Postal portion of the Database subsystem. The Postal Server subsystem is the subsystem in the Public Network that has access to the Database subsystem.

In one embodiment of the present invention, Postal Server 401 is a standalone server process that provides secure connections to both the clients and the server administration utilities, providing both client authentication and connection management functionality to the system. Postal Server 401 also houses postal-specific services that require high levels of security, such as purchasing postage or printing indicia. Postal Server 401 is comprised of at least one server, and the number of servers increases when more clients need to be authenticated, are purchasing postage or are printing postage indicia.

Figure 4:
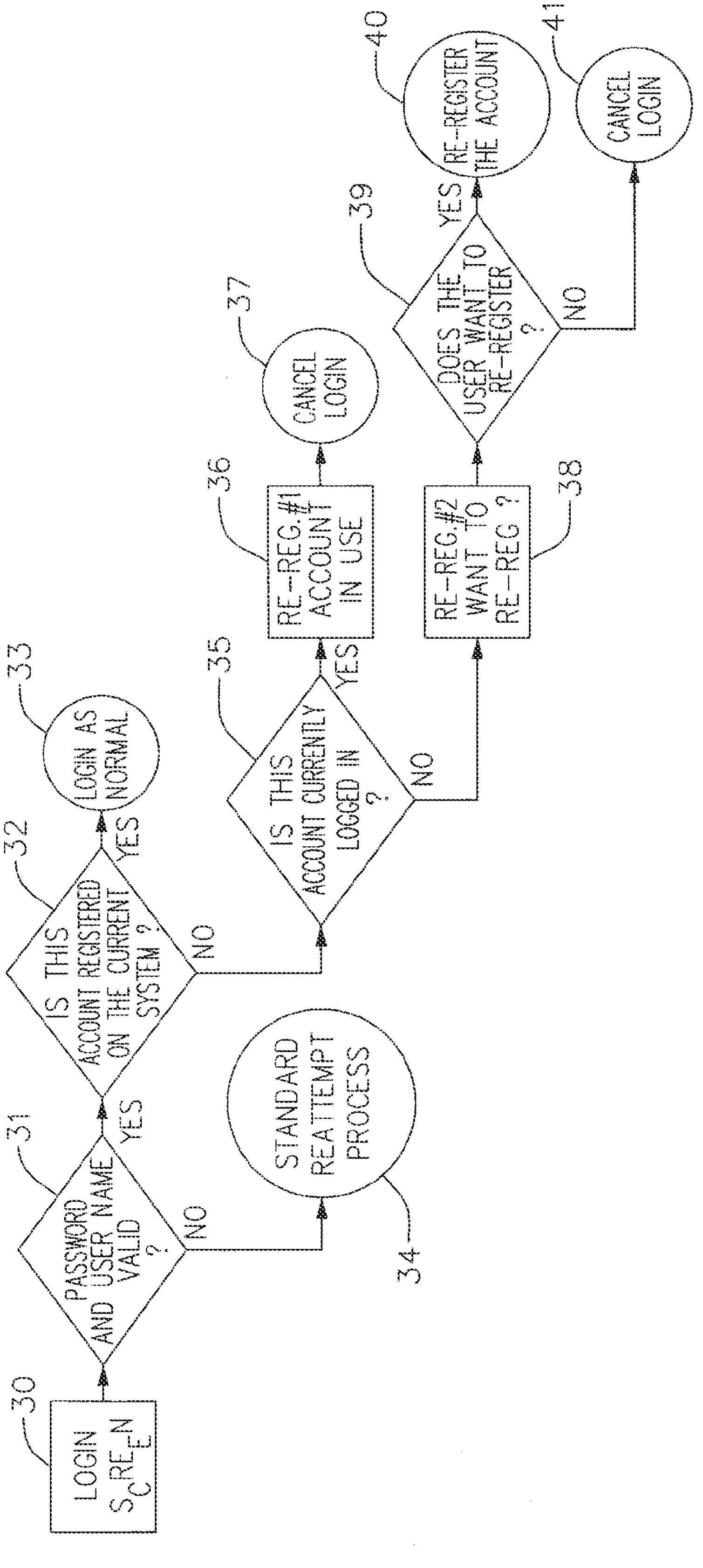
FIG. 4 is an exemplary process flow diagram for a Re-registration wizard.

If a user (customer) is using multiple PCs on one account, the user needs to re-register every time he/she switches computers. A Re-registration wizard helps the user through this process. The user-friendly re-registration process of the wizard does not require users to know their user IDs. An exemplary process flow diagram for a Re-registration wizard is depicted in FIG. 4.

Login screen 30 helps a user to login to the system. The client system sends the user name, password, and system identification information to the server system. After checking if the user name and password are valid (block 31), the server system then checks to determine if the user is currently registered on the current system, or on another one, as shown in block 32. If the user is registered on the current system (computer), login continues as normal, as shown in block 33. If the user is currently registered on another system, the user sees a screen that takes the user into the Re-registration wizard.

If the account is currently logged in, a re-registration screen is shown (block 36) and if the account is in use the login process is canceled, as shown in block 37. If the account is not currently logged in, a registration screen (block 38) asks the user whether he wants to re-register (block 39). If the user decides to not register, the login process is canceled, as shown in block 41.

The system determines the specific systems or PCs that users used by storing information specific to those systems (PCs). In one embodiment, the system-specific information includes register settings, processor's unique ID, machine configuration, network card ID, a user's private key, and the like.

In one embodiment, the system uses a hash message authentication (HMK) key to identify the specific computer (machine) that a user had used to use the system. The client software randomly generates the HMK at the time of user registration. This HMK key is encrypted using a 3DES key derived from the user passphrase. The key is stored on the user's computer before it is sent to the Postal Server during the registration stage. This key is changed on a regular basis. The cryptographic module that resides inside the Postal Server stores this HMK key in a secure database after encryption as a part of the user's PSD package. All cryptographic modules have access to the HMK keys that are stored in this secure database.

The cryptographic module public key that is used to encrypt the user HMK during the key sharing stage is embedded inside the client software package. The cryptographic module uses its corresponding private key to decrypt the encrypted user HMK forwarded by the Postal server during the user registration stage. This security technique is generally more difficult to break than simply using a user's password as a security method. The encrypted HMK key on the user's computer is decrypted when a user logs on to the client software with the proper password. During the rest of the client session, the HMK key is used to sign individual server requests and authenticate itself to the server.

When a user attempts to launch the client software from a different computer, the client software detects that the encrypted user HMK is missing, and starts the re-registration process. The cryptographic module requests the user to provide the correct user passphrase. Every cryptographic module has a user chosen passphrase with a host-imposed level of entropy. The passphrase is not stored on the user's computer. The hash of the passphrase is transmitted securely to the PSD and stored encrypted within the PSD package.

The cryptographic module can detect that the user is registering from a different computer because the user HMK, which is stored on the local computer at the time of registration, binds the computer to the software that initiated the registration process. If the client goes through the re-registration process on another computer, a new user HMK is generated, shared with the server, and stored on the new computer. Since the user HMK is used to authenticate the client to the server for every individual server request, the cryptographic module can detect that the user has been registered on another computer because the user HMK authentication fails.

This design provides a warning to a user that has changed his/her computer. It protects the user against someone else using the user's information and logging into the system on a different computer.

Figure 5A:
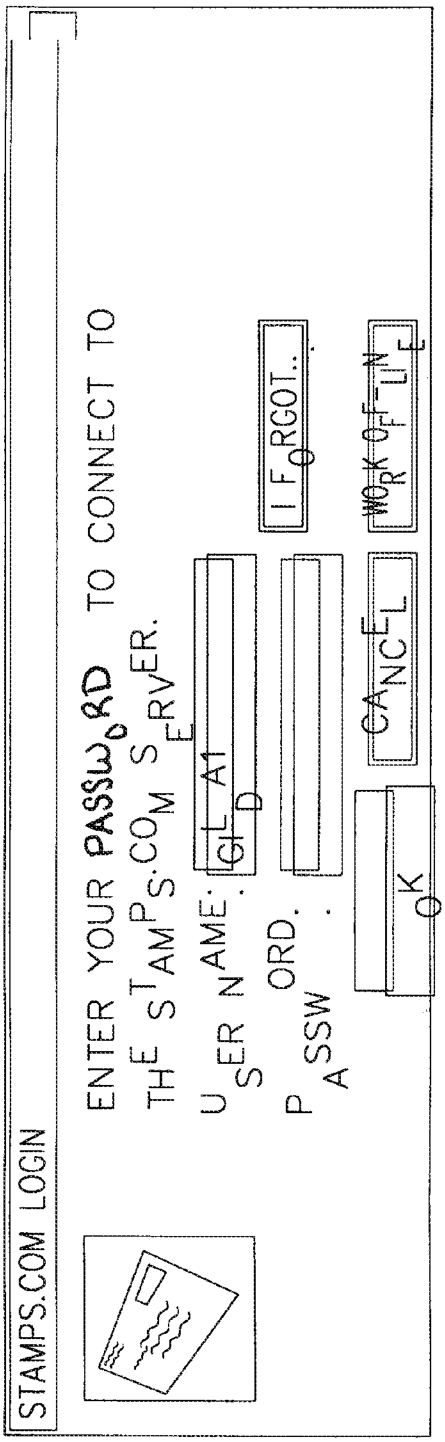
FIGS. 5A–5J are exemplary screens for a registration process according to one embodiment of the present invention.
Figure 5B:
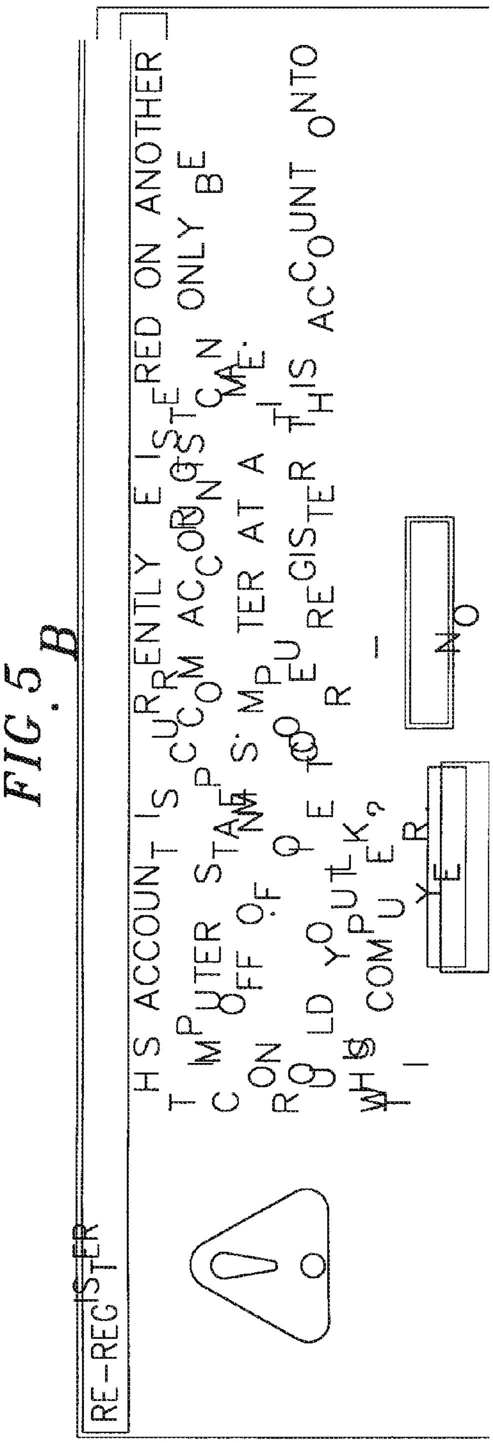

After a user registers using the registration screen shown in FIG. 5A, the exemplary screen shown in FIG. 5B opens to let the user know that the account is already registered on another computer and gives the user the option of registering the account on their current computer. If the user clicks "Yes", the first screen in the Re-registration wizard opens. If the user clicks "No", the Cancel Re-Registration Failed Screen opens.

Figure 5C:
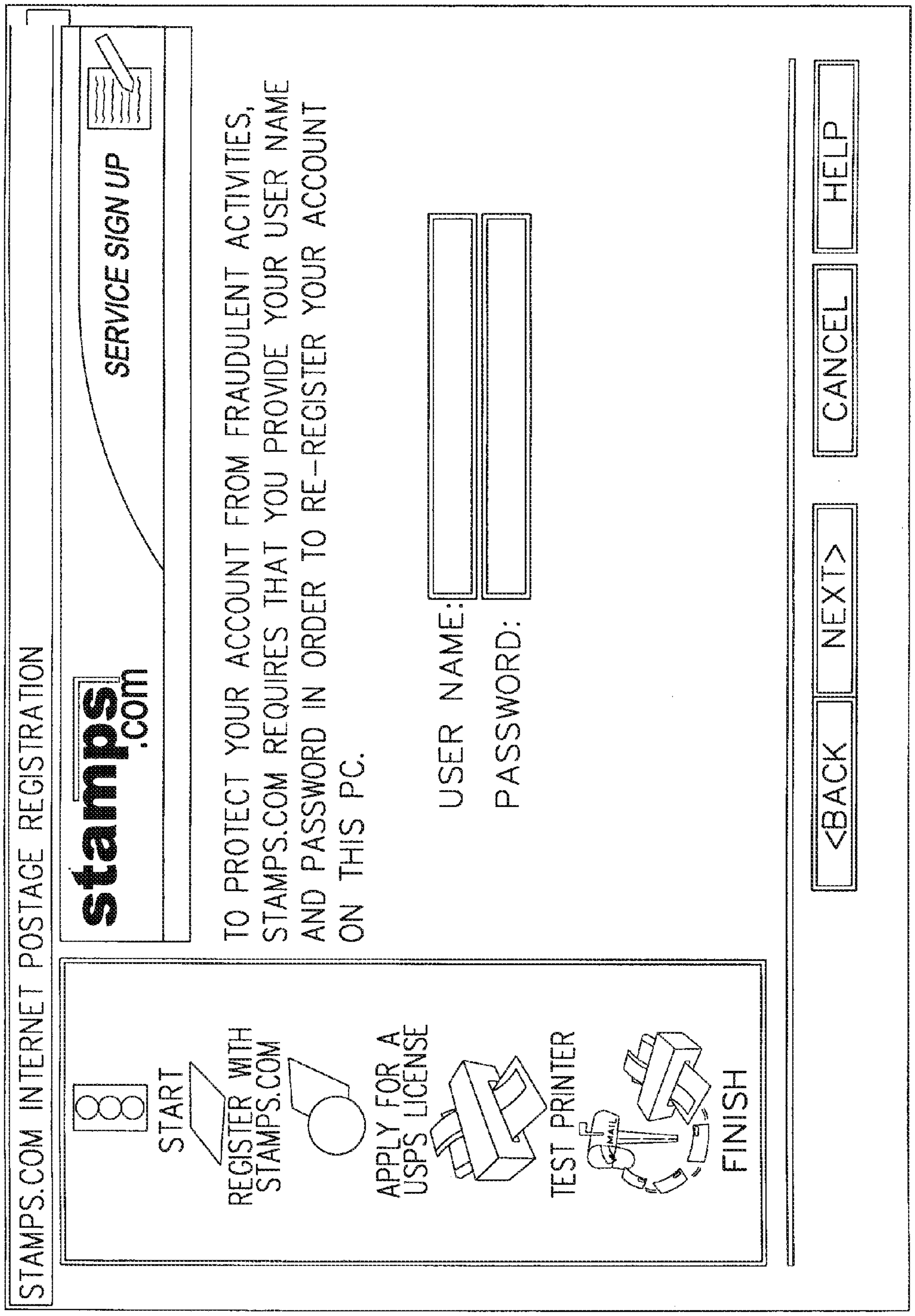

The exemplary Name and Password screen of FIG. 5C is the first substantive screen of the Re-registration wizard. This screen lets the user enter his/her user name and password. This screen can be accessed by checking the "I have already registered with Stamps.com" check box on the Welcome Screen of a Getting Started Wizard. Alternatively, it can be accessed from the vendor Program Group—vendor Internet Postage Re-register. Finally, this screen opens if the user clicks "Yes" in the "Account is Registered on Another Computer" screen. Preferably, the "Cancel" and "Help" buttons are enabled on open. The "Next>" button becomes enabled when the user has entered text into both fields. Preferably, the "<Back" button is not enabled.

Figure 5D:
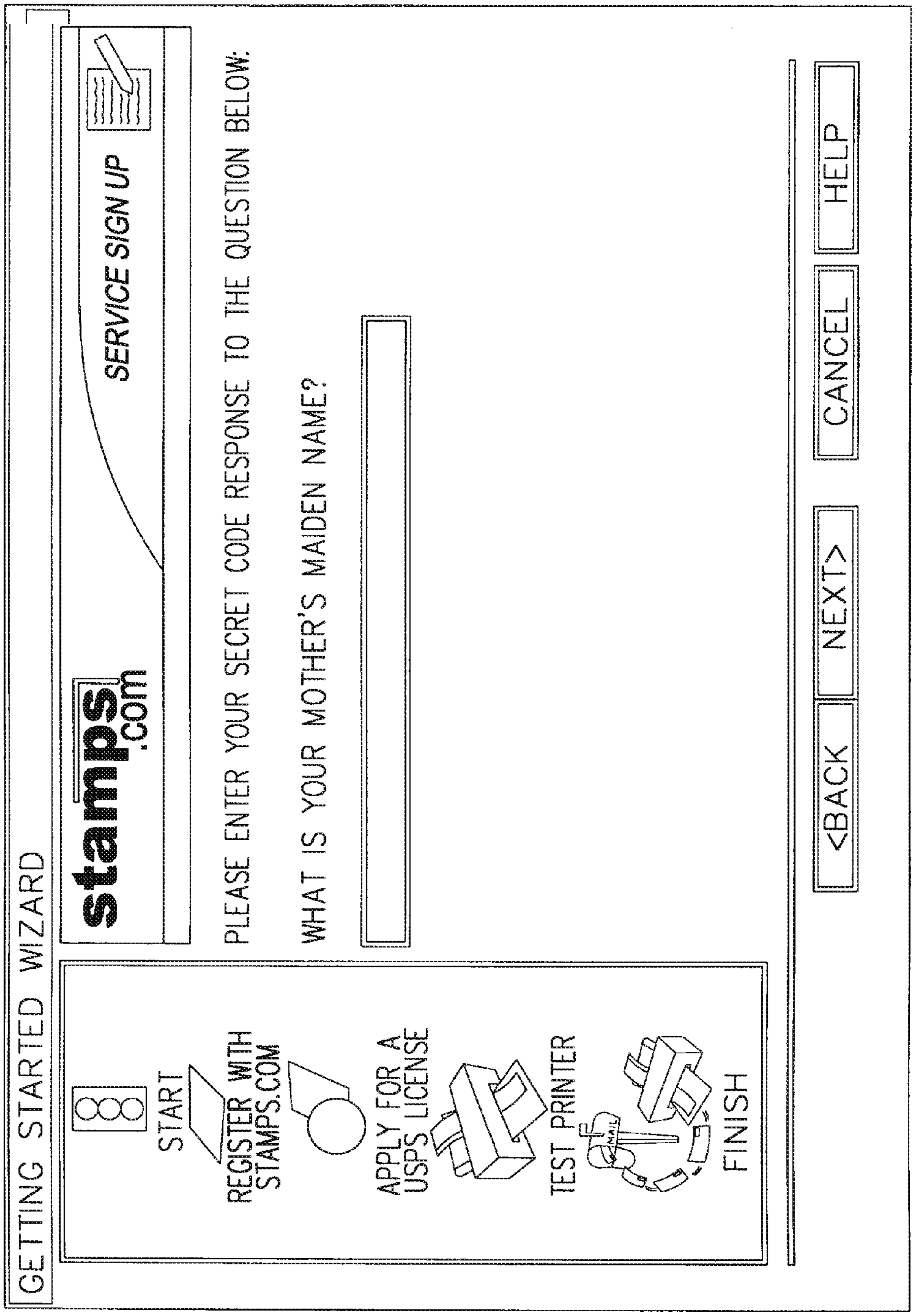
Figure 5E:
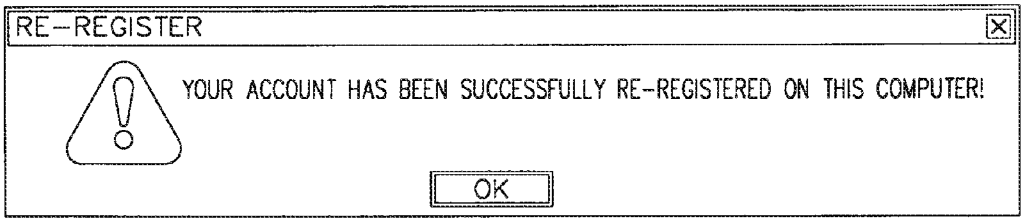
Figure 5F:
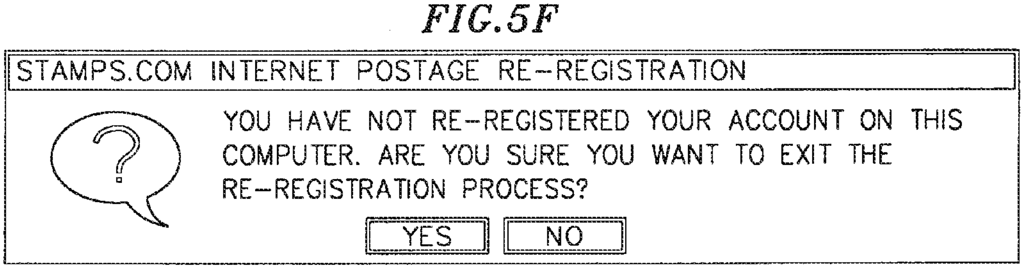

The "Secret Code Response" screen show in FIG. 5D allows the user to enter the secret code they supplied when they first registered with a vendor. Preferably, the question changes based on the original secret code question selected by the user. For example, if the user selected "Pet's name" the question reads, "What is your favorite pet's name?" Preferably, if the user entered an incorrect user name or password in the previous screen, this screen opens with the "Mother's maiden name" question. This helps guard against fraud. Preferably, the "<Back", "Cancel" and "Help" buttons are enabled on open. The "Next>" button becomes enabled when the user has entered text into both field. If the user entered the correct information in both screens, the exemplary screen of FIG. 5E opens to tell the user that re-registration was successful. If the user clicks the "Cancel" button at any time during the re-registration process, the exemplary screen shown in FIG. 5F opens.

Figure 5G:
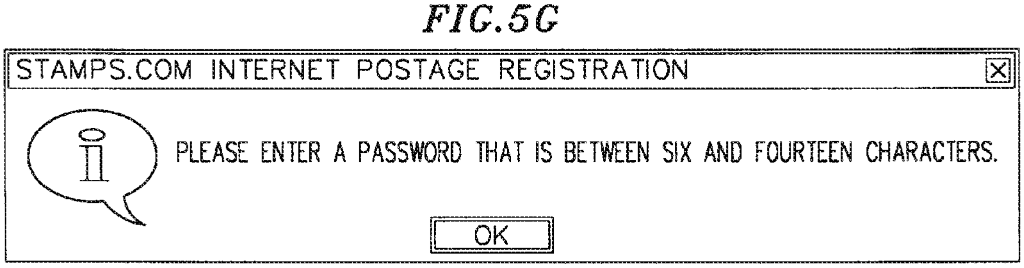
Figure 5H:
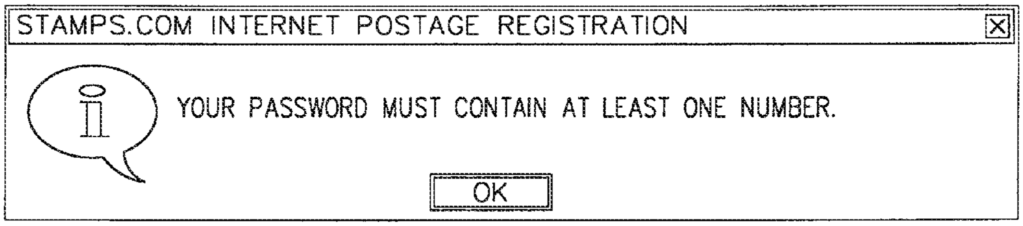
Figure 5I:
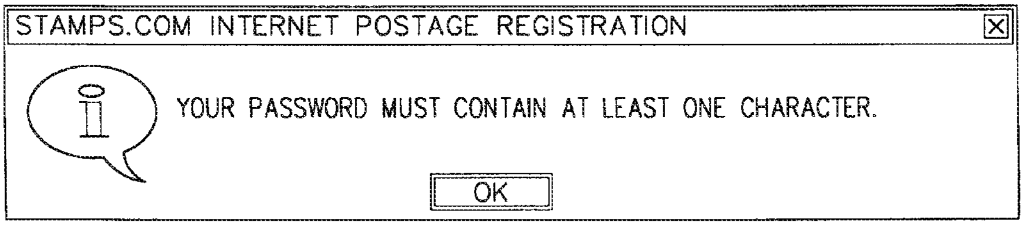

FIGS. 5G–5I are exemplary error screens for the Re-registration wizard. The Password-Length screen of FIG. 5G opens if the password is for example, less than 6 or greater than 14 characters. The "No Number in Password" screen of FIG. 5H opens if the password does not contain any numbers. The No-Alphabetic-Character-in-Password screen of FIG. 5I opens if the password does not contain any letters. A "Secret Code Response Error" screen opens after the "Secret Code Response" screen. This screen will also open if there are errors in either the "Secret Code Response" or "User Name and Password" screens.

Figure 5J:
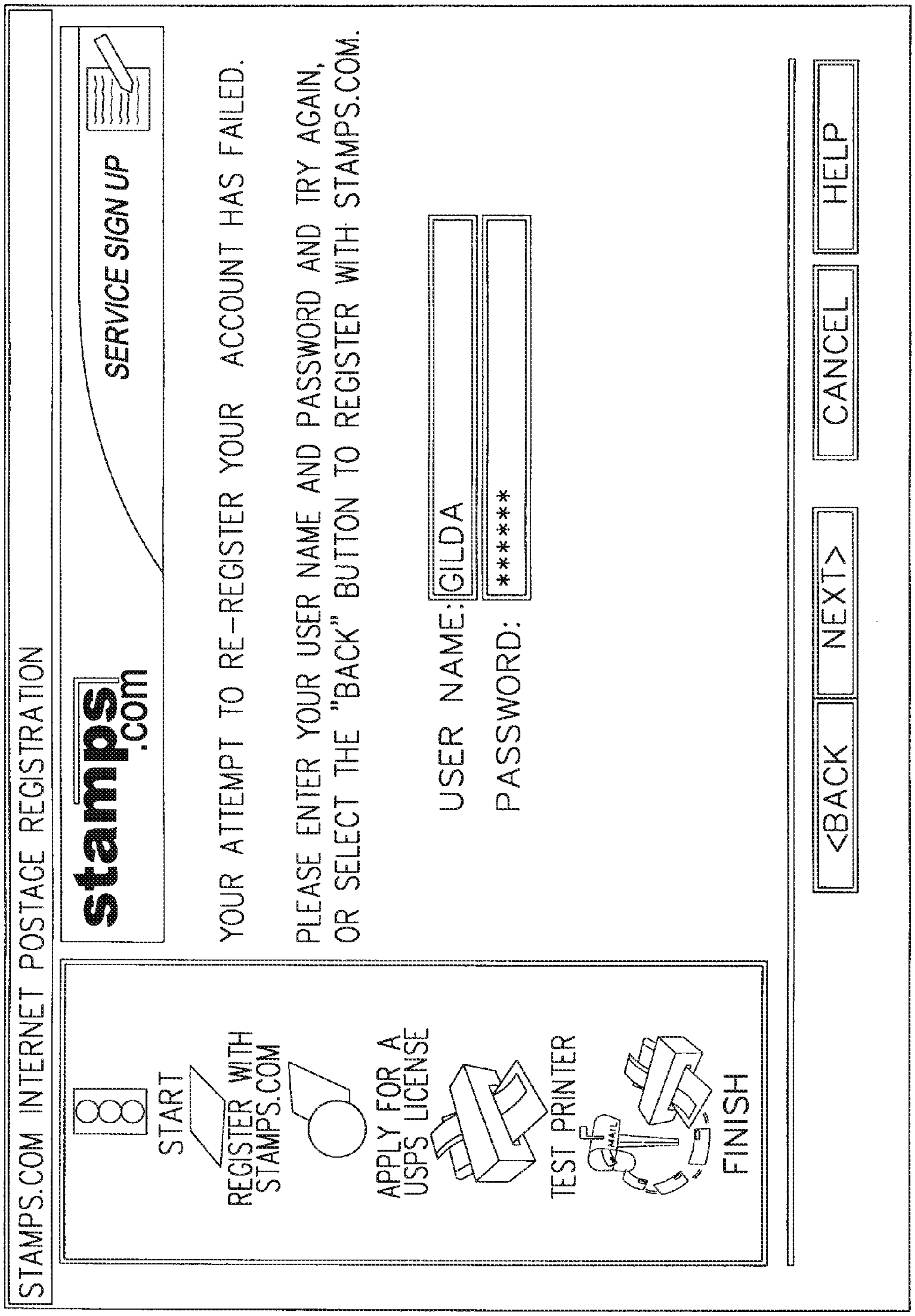

If the user enters incorrect information in either or both screens the exemplary screen shown in FIG. 5J opens. Preferably, the user is not told which information is incorrect to protect against fraud. Preferably, the "Cancel" and "Help" buttons are enabled on open. The "Next>" button becomes enabled when the user has entered text into both fields. Preferably, the "<Back" button is not enabled. Typically, some users lose their passwords and will not be able to login to the system. Giving anyone but the user access to their password would be a major security violation. The following describe a process for user password recovery.

The password recovery process maintains a high level of security, while still allowing a user the flexibility to gain access to the client software. In the current systems, Customer Support (CS) verifies user identity based on the last four digits of the user's Social Security #. This presents two problems: 1) not all users will input their SSN, they have the option to input Employer ID or Tax ID 2) most personal information (name, social security/tax id number, e-mail address, etc.) can be stolen or discovered easily by a third party.

To overcome these problems, the system uses a "code word" for user verification. This word is recorded during registration, and is something natural to the user. During registration, the users will be given the choice of a few different types of code word associated with a question (e.g., what is your mother's maiden name?). If a Customer Support Representative (CSR) needs to verify identity, they can ask the user this question and the last four digits of their identification number (SSN, Tax ID or EID).

Typically, lost password recovery can happen in three ways: On the phone with CS, through the client (requires adding a "Forgot my Password" to the login screen), or through e-mail with CS. In all these cases, the users will not get their actual password back. They will get a temporary 'Reset Password' that is only good for one login. The next time the user logs into the client, they are immediately prompted to change their password. They will not be allowed to progress until they change their password.

The Reset Password is typically e-mailed to the e-mail address the user has on file in the database. After the CSR or the user has entered the user information, the Postal system compares that data to the information on file. If the information matches, the Reset Password e-mail will then be created and sent without any human intervention. The CSR or the client will display a confirmation or denial dialog to provide feedback on this action.

Figure 6C:
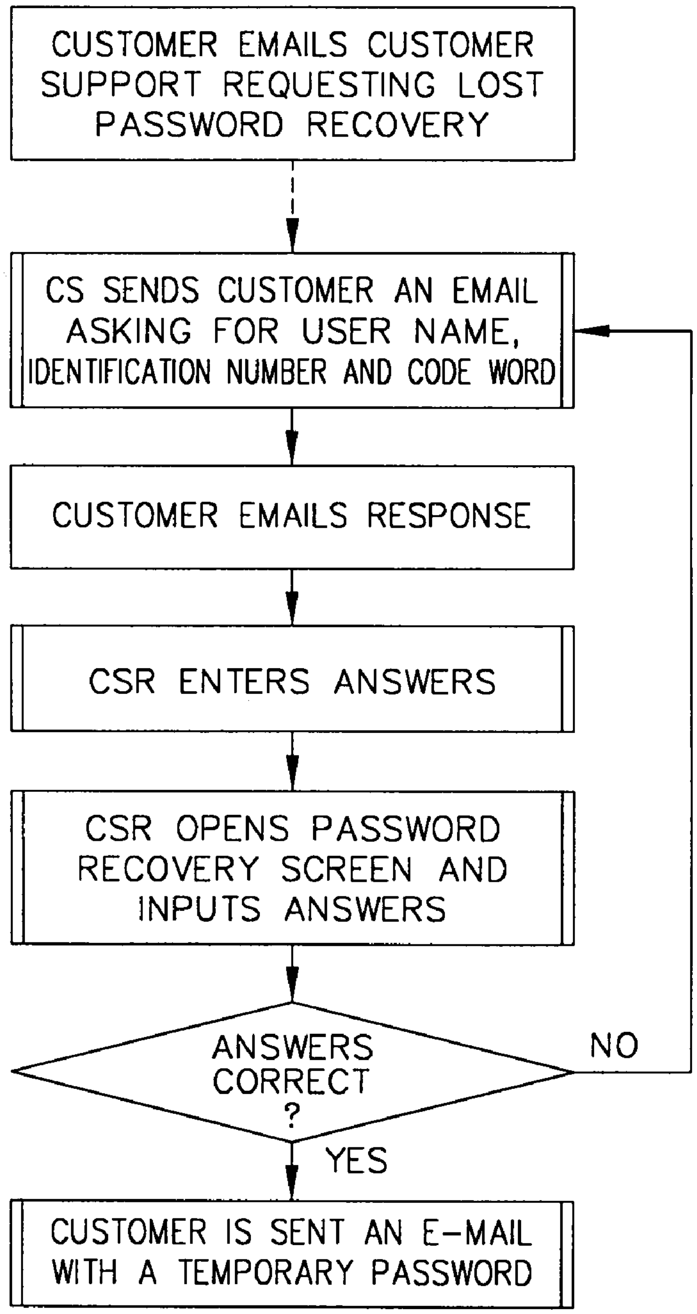

FIGS. 6A–6C are exemplary flow process diagrams for the above three cases. An exemplary Password Reset process flow is as follow:

1. User Forgets Their Password and Needs to Reset it

Does the user attempt to recover it through e-mail? Go to step 9

Does the user attempt to recover it over the phone? Go to step 4

Does the user attempt to recover it through the client? Go to step 2

2. User Chooses "Lost Password" Option in Client Software

User is prompted for information. Enters her code word and last 4 digits of identification number. If the user enters incorrect information 5 times in a row, she should close and reopen the client or contact Customer Service.

Did the user enter the information correctly by the $5^{th}$ time? Go to step 3

Did the user fail to enter information correctly by the $5^{th}$ time and closed and re-opened the client? Repeat step 2

Did the user fail to enter information correctly by the $5^{th}$ time and contacted Customer Service via e-mail? Go to step 9

Did the user fail to enter information correctly by the $5^{th}$ time? Contact Customer Service via phone, go to step 4

3. User Receives Confirmation that the Password is Sent

Dialog states "Your temporary Resetting Password was sent to xxx@xxxx.net, please return to this screen to enter your temporary password". Go to step 7

4. User Calls Customer Support to Reset Password

User tells CSR they forgot their password. Go to step 5

5. CSR Goes to PW Recovery Screen

CSR asks user validation questions.

CSR enters responses (code word+last 4 digits of SSN or Tax ID or EID) in dialog—does not have viewing rights to information. CSR reads answers back to user for verification.

Did the CSR enter information correctly? Go to step 6

Did the CSR fail to enter information correctly by the $5^{th}$ time? Close and re-open the Password Recovery screen. Repeat step 5

6. The user is automatically e-mailed a password good for one login.

The Postal Servers randomly generates the password send the e-mail.

CSR receives confirmation was e-mailed, is shown the e-mail address where e-mail was sent.

Go to step 8

7. User Logs into Client with Temporary Password

Client dialog box forces user to enter a new permanent password

User cannot access any client features until a new password is entered

8. END

9. CSR receives e-mail

CSR should look up user in CS interface with info that is on their e-mail. They access the Password Recovery screen to find the code word question, just as if the user was on the phone 10. CSR replies to user CSR uses standard internal (non-Postal System) e-mail form to ask for SSN or Tax ID or EID+code word question. Go to step 11

11. User replies to CS e-mail

CSR enters information into Password Recovery screen. If the user's response is not valid, the CSR send the user an e-mail asking them to resubmit. If it is valid, the CSR hits "OK" at the e-mail prompt. Go to step 6.

Figure 7A:
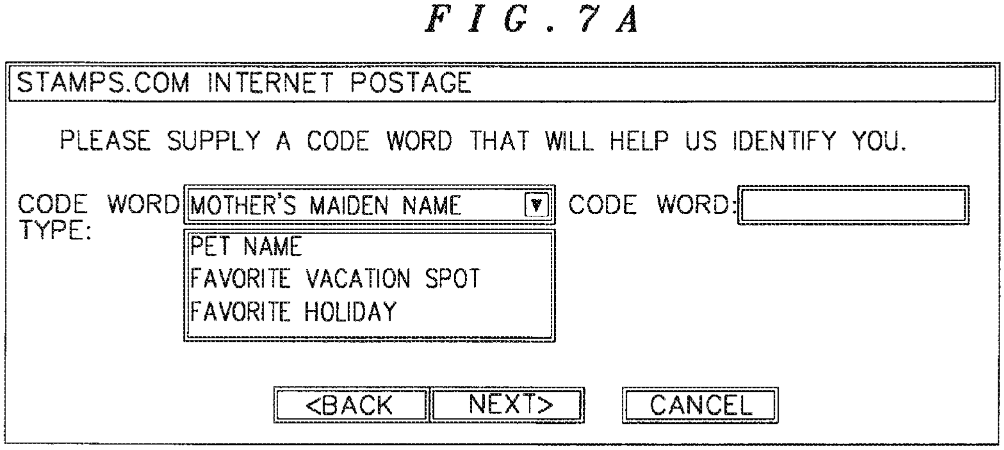
FIGS. 7A–7G are exemplary screens for supplying a secret code and password recovery according to one embodiment of the present invention.
Figure 7B:
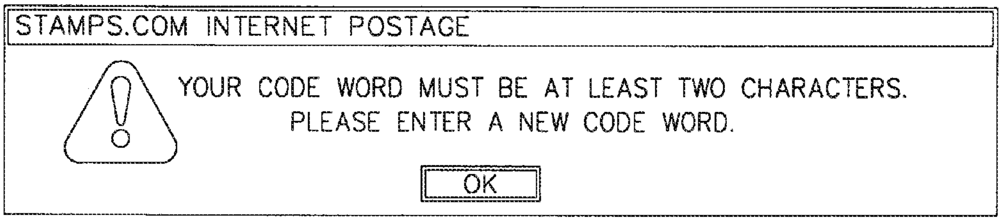

FIGS. 7A–7G are exemplary screens for supplying a secret code and password recovery. In one embodiment, the screens asking for Secret Code may be integrated with the client Registration wizard. The "Lost Password" option may be added to the existing Log-In dialog. Lost Password screens may be required as additional dialog within the client. FIG. 7A is an exemplary screen for supplying a secret code. In one embodiment, the screen fits into the Registration wizard and preferably has the following functionality:

None of the code word types are selected by default

The "Next>" button is disabled until the user selects a Secret Code type and enters a valid Secret Code The list of Secret Code types include:

Mother's Maiden Name

Pet's Name

Favorite Vacation Spot

Place of Birth

Additional Secret Code types can be added to the client software as long as they support text code words. Dates or numeric code words could be entered differently every time (i.e. a birthday may be entered as 02/02/59 or 2/2/59, etc.)

When the user hits the "Next>" button in the screen of FIG. 7A, the client software verifies that the code word length is >=2. If the code word length is <2, the pop-up box of FIG. 7B opens. The user is returned to the code word screen when they hit the "OK" button. In one embodiment, there is an active validation of the code word field. This means that the Next button would be disabled until a valid code word is entered, no additional dialog box would be needed in this embodiment.

Figure 7C:
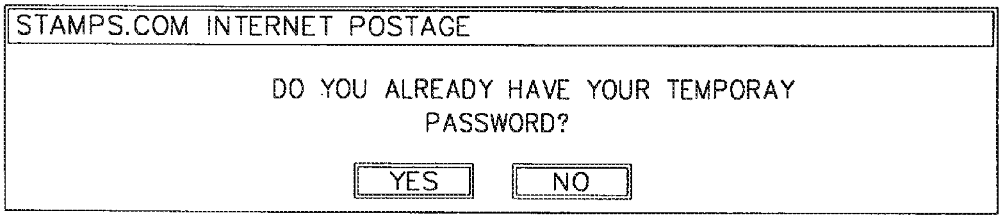
Figure 7D:
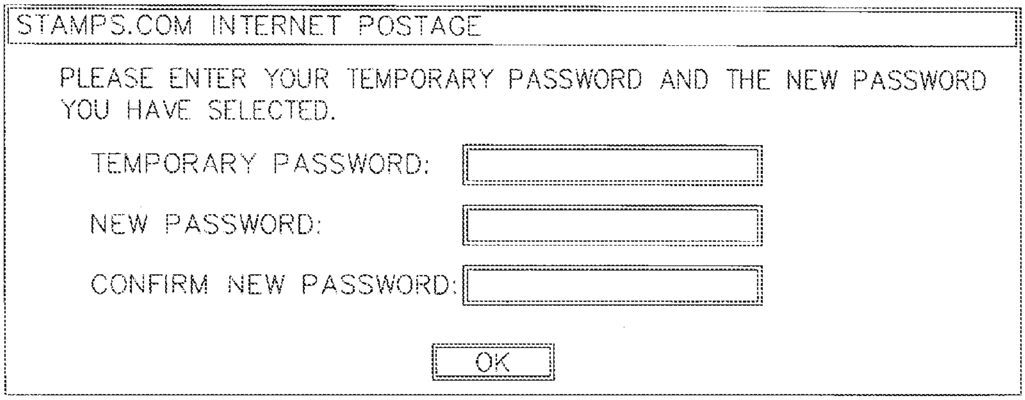
Figure 7E:
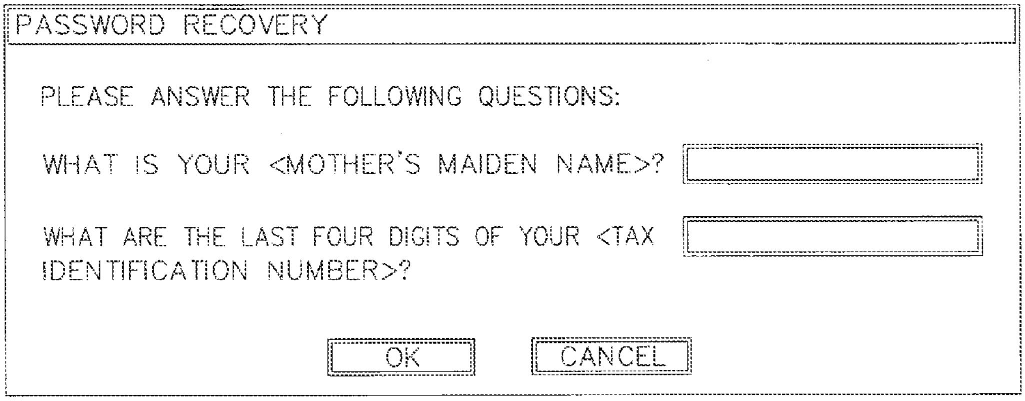

A "Forgot My Password" screen is included in the initial login screen, as shown in FIG. 7C. If the user hits the "Yes" button in this screen, the exemplary screen of FIG. 7D opens. The same error checking used when a user initially chooses a password applies. Once all the information is validated, the standard login screen is opened. The user should be able to login using his/her new password. If the user hits the "No" button, open the client version of the Password Recovery screen. A sample screen appears as shown in FIG. 7E. This screen pulls the client's Secret Code question based on the user's user name.

Figure 7F:
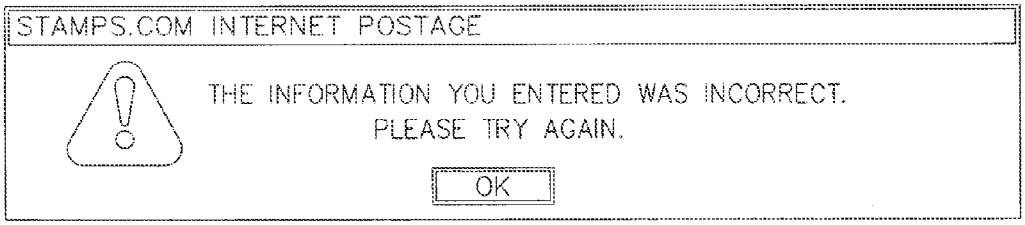

<mother's maiden name> is changed to the appropriate question for the Secret Code type <Tax Identification Number> is changed to the appropriate question for the identification number type If the user enters incorrect information, the exemplary message of FIG. 7F appears. As an added measure of security, if the user enters incorrect information, for example, 5 times, the above message is continuously shown even if the user enters the correct information. The user will be forced to close and re-open the client to try again or contact Customer Support. If the user enters the information correctly the confirmation message of FIG. 7G is shown.

Figure 7G:

In the exemplary screen of FIG. 7G, the "OK" button closes the client. If the user never receives the e-mail or the letter, they should repeat the process to have a new password sent out. A sample Reset Password e-mail template appears below. The CS Manager is able to modify the text of this e-mail by going through normal operational e-mail update procedures.

At your request, we have temporarily reset your password to <password>. This password is only good for one login. For your protection, you will be required to change your password when you login.

The next time you login, click on the "Forgot my Password" button on the initial login screen. You will be asked if you have a temporary password. Click the "Yes" button. You will be prompted to enter your temporary password and a new password. You will then be able to login using your new password."

Whether a user contacts Customer Support over the phone or via e-mail, CSR's will need a new interface for password recovery. This interface shows the user's code word question (based on the code word type) and provides a space for the CSR to enter the user's code word and the last four digits of the user's identification number (SSN, Tax ID, or EIN) The code word and identification number questions are generated dynamically based on the user name. The CSR will be able to re-enter the information until it is correct. Note that the CSR only has the ability to enter the code word and identification number. Once they are entered, the CSR has no other access to this information.

Figure 8A:
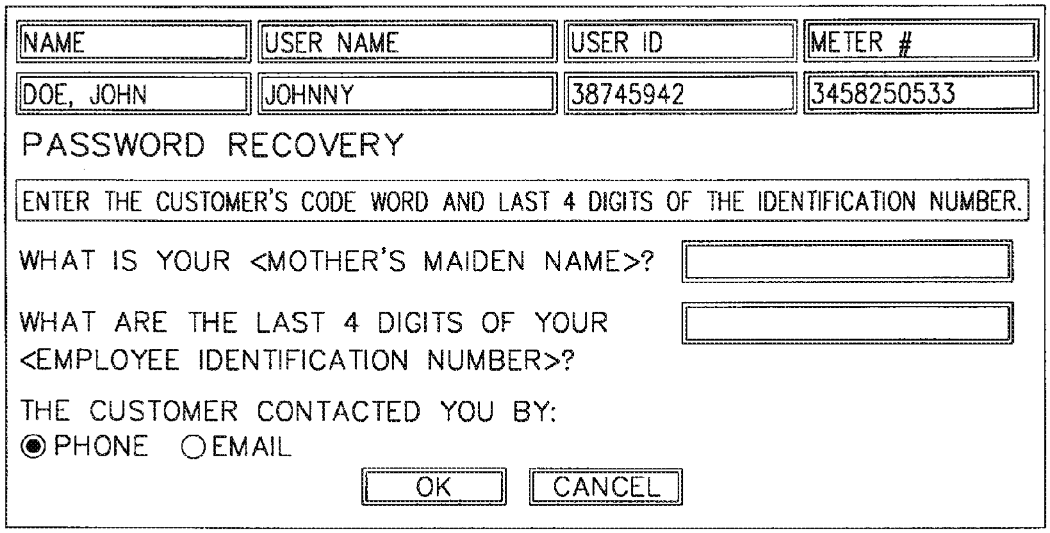
FIGS. 8A–8C are exemplary screens for password recovery according to one embodiment of the present invention.
Figure 8B:
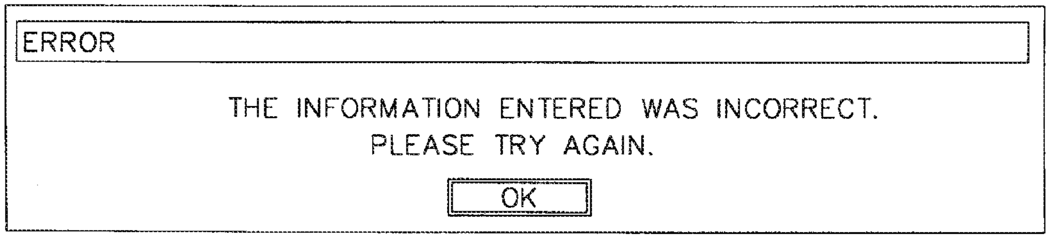
Figure 8C:
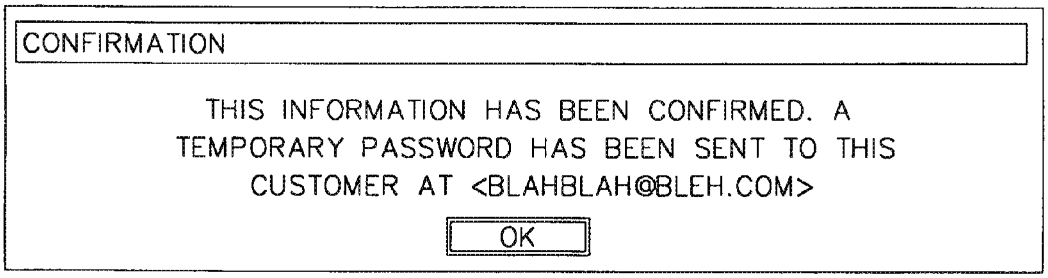

Once the CSR successfully enters the code word and identification number, the CSR is prompted to confirm the user's current e-mail address and change it if necessary. The user is then sent an e-mail with a new, randomly generated password. The CSR is shown a message to this effect and will inform the user. A sample Password Recovery screen is shown in FIG. 8A. In this screen:

<mother's maiden name> will be dynamically replaced with the appropriate Secret Word type question <Tax Identification Number> will be replaced with the appropriate identification number question Contact via Phone radio button is default value If the CSR enters the information incorrectly, the dialog box shown in FIG. 8B opens. The "OK" button in this dialog box returns the CSR to the PW screen. Once the CSR successfully enters the information, they need to confirm the user's e-mail address or give the user the option to receive the password via mail. The message: of FIG. 8C then appears. In this dialog box, the "OK" button closes the password recovery screen. If the user never receives the auto e-mail, the user should again call CS to repeat the process to have a new one generated.

For the situations where a person initiates a password reset via e-mail, the standard e-mail template that Customer Support uses to ask that person for their code and identification number should also include instructions on how to reset their password via the client. An example of this e-mail appears below. The CS Manager should be able to alter the text through standard operational procedures and QA. The CSR will obtain the correct word question and identification number type from the normal CSR Password Recovery screen (which is populated based on the user's profile).

Dear <customer>,

In order to complete your request, you will need to answer the following questions:

What is your <mother's maiden name>?

What are the last four digits of your <social security number>?

Once we have received and verified your answers, we will e-mail you a temporary password.

A Password Reset Activity report can be generated by the system. This activity report is a summary that shows all the password reset activity for a time period. This report is not time-critical and can be generated from the offline database. A Password Reset Activity report may also be generated by the system. This report is a summary report of all password reset and related activities generated from the Offline database.

A Customer Profile database in the server system includes the following fields to support the temporary password reset process:

A Secret Word field (suggested type and length is varchar-30)

A Secret Word type field.

A code field (suggested type is code integer) that identifies if the password was reset through the client; by Customer Support via e-mail; or Customer Support via phone.

Last four digits of user's Identification number, taken during Registration

Code (or full description) for the Identification number, classifying it as a SSN, Employer ID or Tax ID.

Since the code word and code word types are personal identification information, they are preferably stored in the same table and with the same level of security as other personal user information.

The postal servers compare Resetting password information with real user information, generate random passwords, update client with information to prompt the user to enter new password after she uses the resetting password (this could be a function of the content of the resetting password), and generate e-mail with password and mail. CS is capable to modify this e-mail template through normal operational e-mail update procedures.

In one embodiment of the present invention, a user of the Internet on-line VBI system has the ability to print a partner's logo or advertisement next to a value-bearing (e.g., postage) indicium according to the IBIP specification. The system provides a secure environment such that only authorized text or graphics are printed next to a postage or VBI indicium. In order to achieve this goal, the client software uses a digital signature to ensure that graphics are authorized by the Internet VBI system. Each graphic (e.g., bitmap) is assigned with a unique digital signature resource file.

This digital signature file is created by running a DSA mathematical process with a private key and a graphic file as an input to the system. When a user attempts to print a graphic file using the Internet on-line VBI client software, each graphic file is verified by running a DSA system using a public key and the previously assigned digital signature. The verification routine determines if this graphic file has the correct digital signature file. If the graphic file does not pass this verification process, it is rejected from being printed because the graphic file is not properly authorized by the client software.

The system allows for the customization of the installation script in several ways, including the option of running a silent install, defining a default installation directory, and defining a default installation group. Preferably, the default behavior of the installation routine is to run as an application that is visible to the user, and requires user input on multiple screens during the installation process. The option of the "silent install" installs the program files to the user's system without being visible, and without requiring user intervention.

For the default directory path option, the installer needs to be told where to install the product's files. While the user may choose to install the product in any directory location they want, the installer offers them a choice consistent with the product identity. Every product is placed in a sub-directory within the master directory. The OEM partner or the advertiser has the ability to provide a name for both the master directory and sub-directory into which the Internet VBI product will be installed.

For the default installation group choice, the program group, or "folder", is the location in which the installer will display the product if the user does not manually choose a different one. The system allows the OEM partner or the advertiser to customize the Default Program Group name. The OEM partner or the advertiser does not have the ability, however, to change the name or associated icons of the items within the group.

Figure 9:
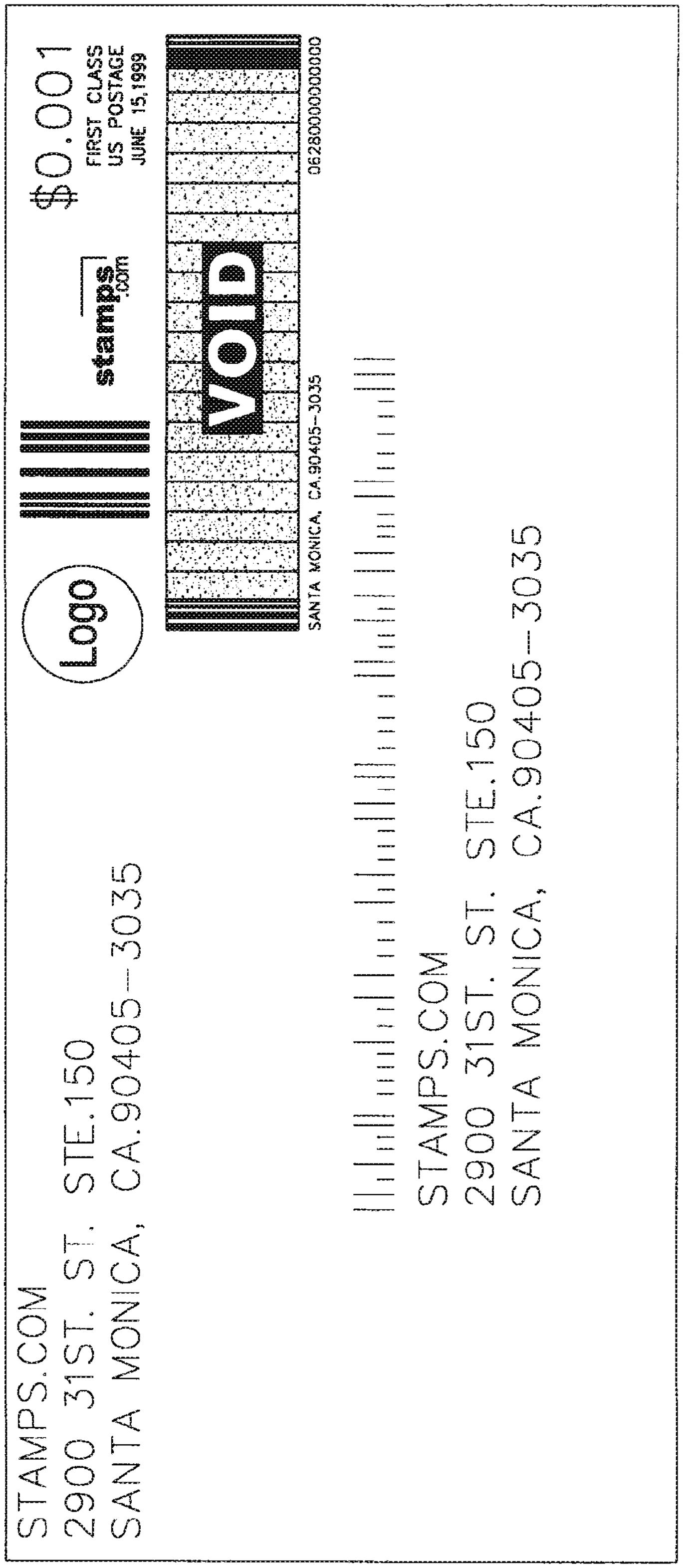
FIG. 9 is an exemplary screen for displaying a logo or slogan of an OEM or advertiser according to one embodiment of the present invention.
Figure 1:
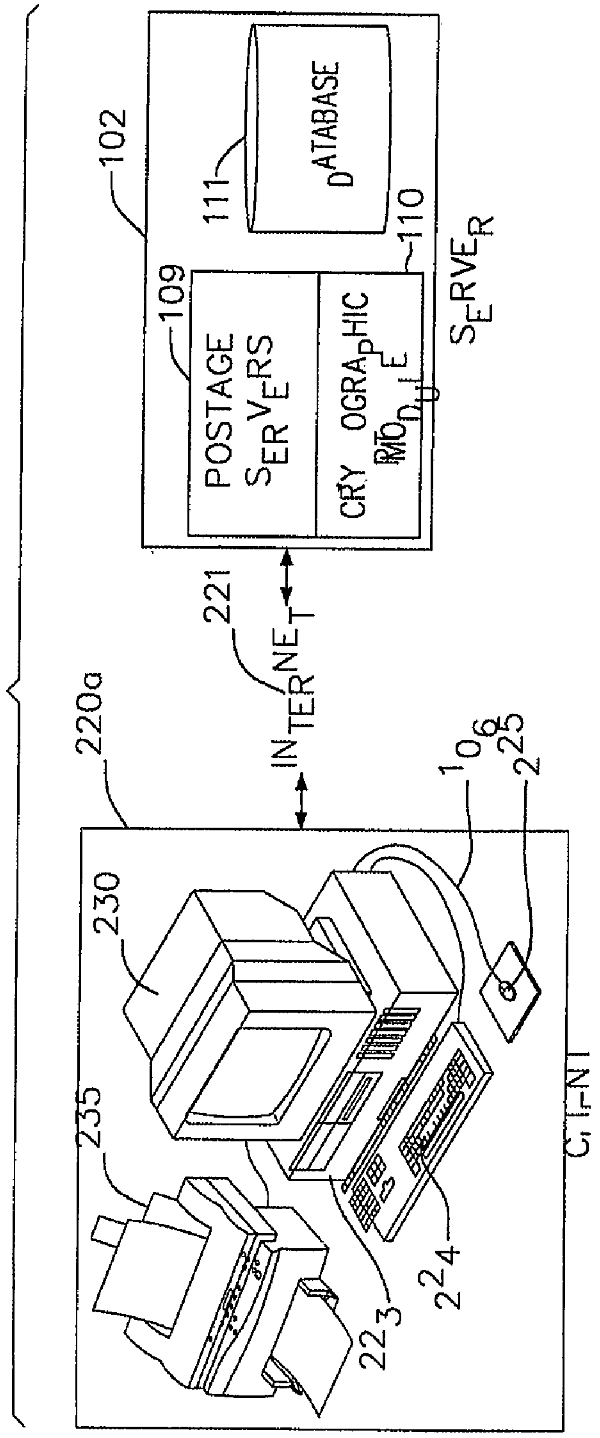
Figure 2:
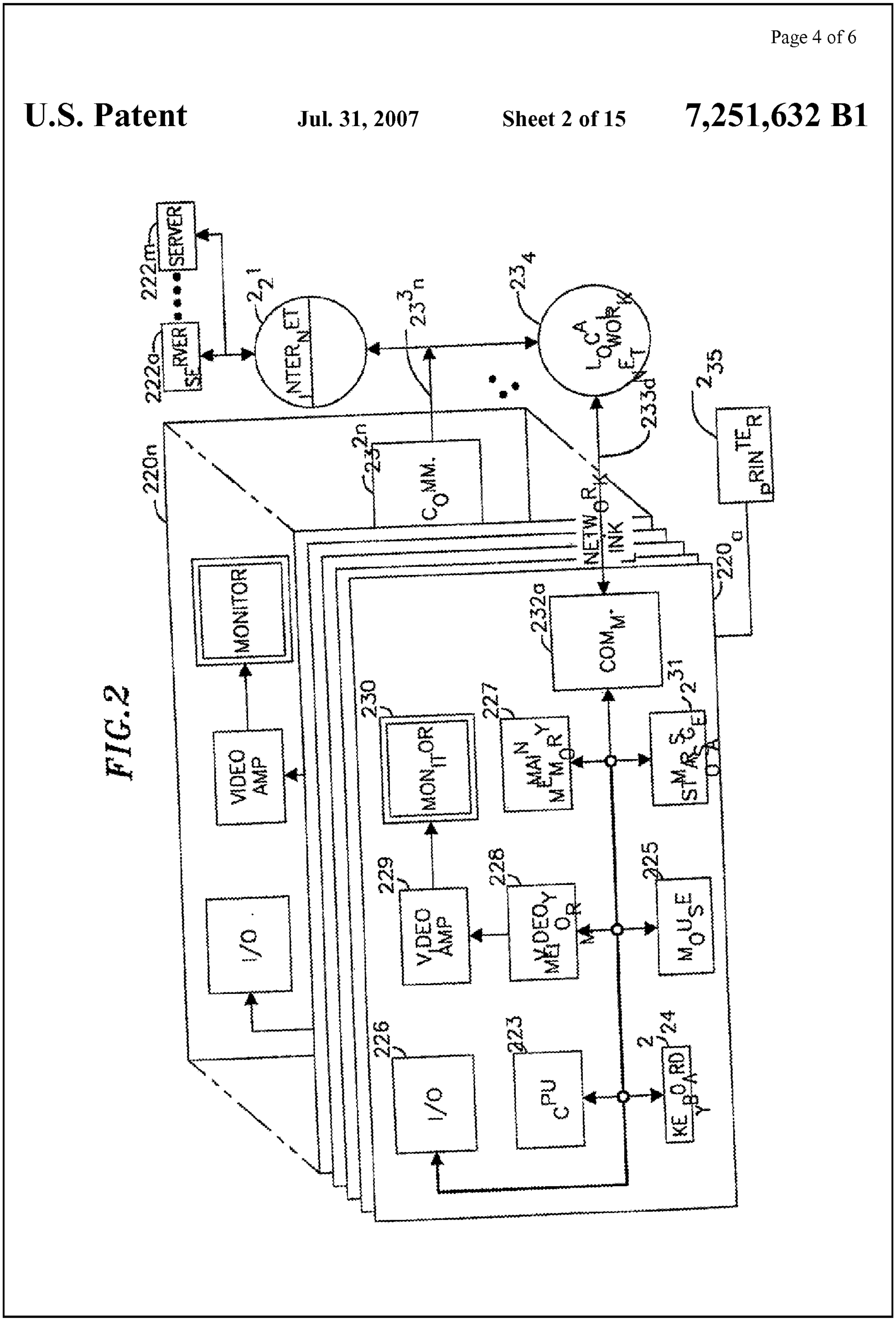
Figure 4:
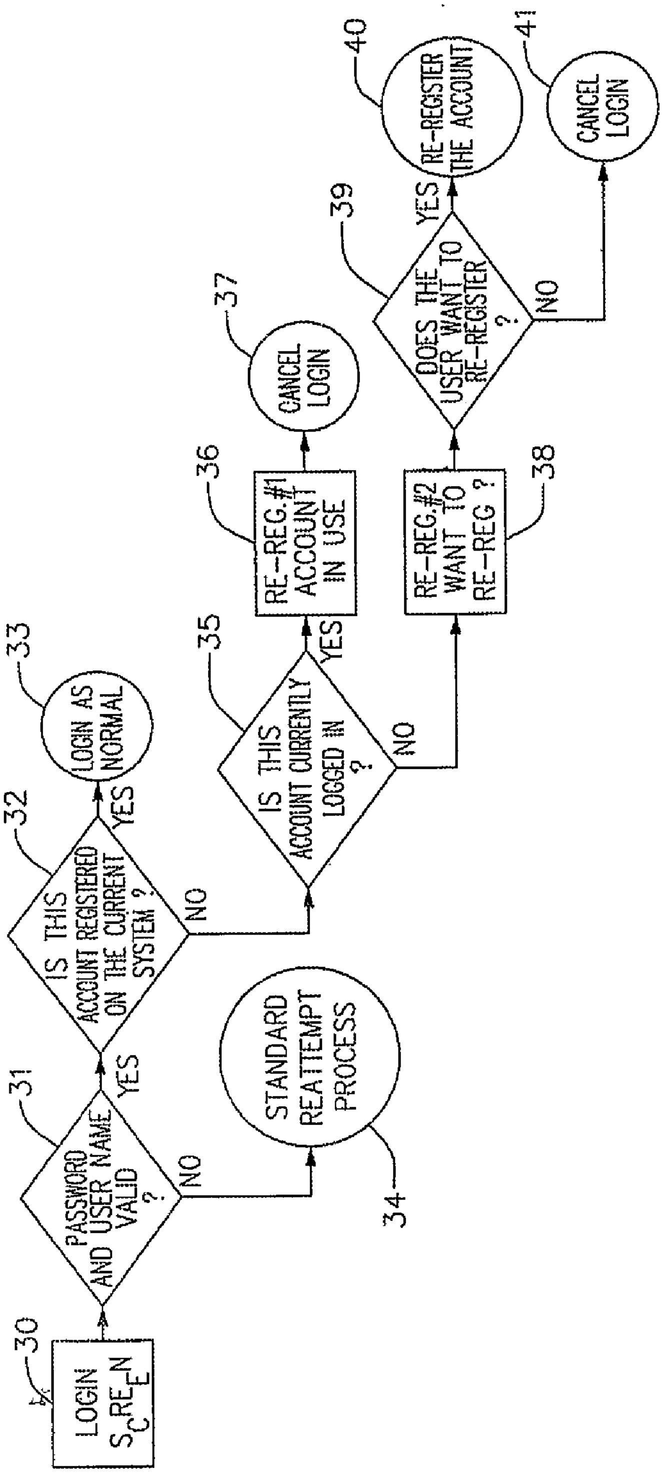
Figure 5A:
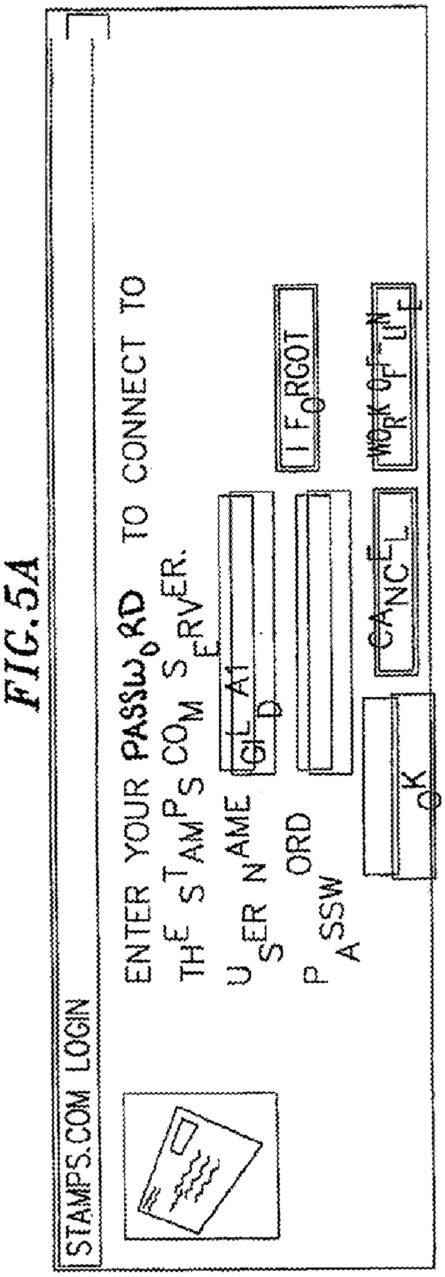
Figure 5B:
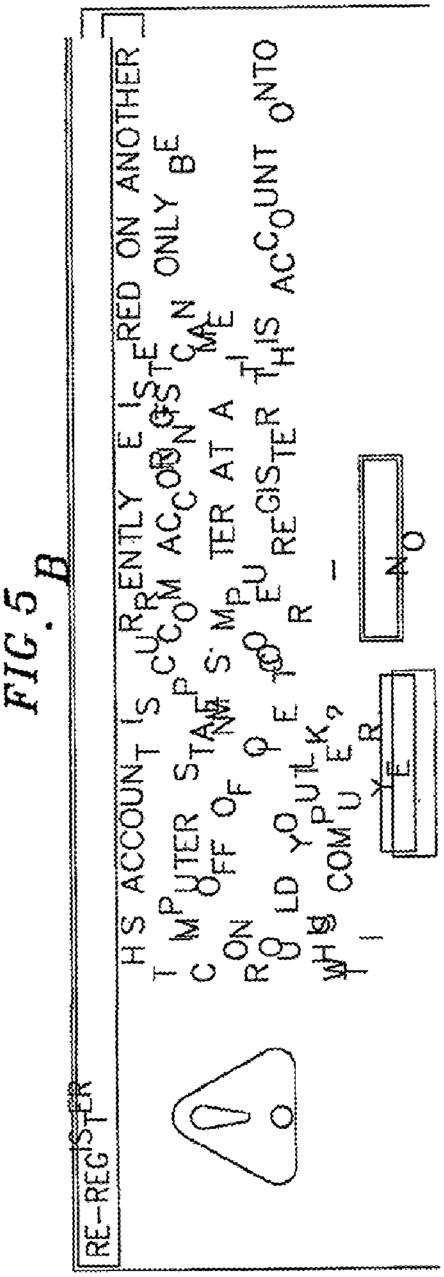
Figure 1:
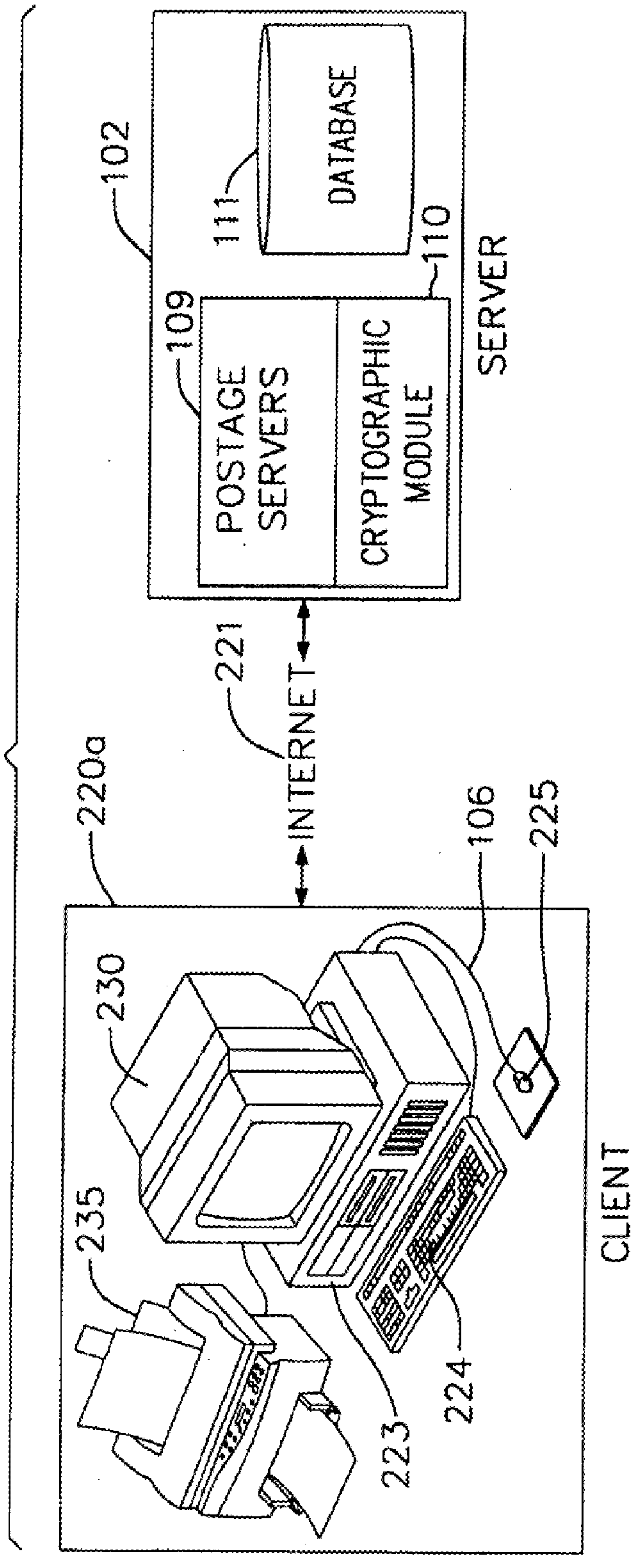
Figure 2:
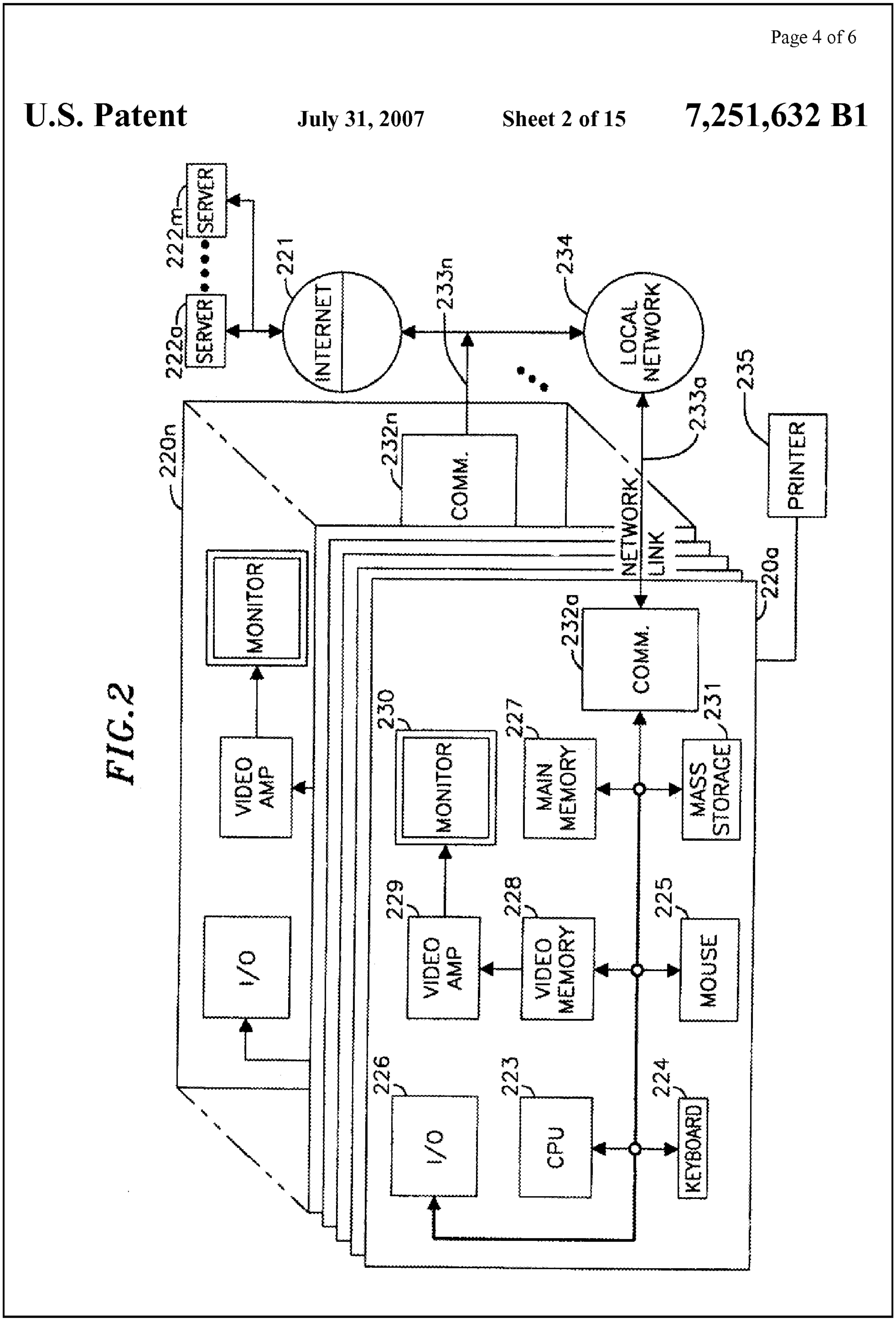
Figure 4:
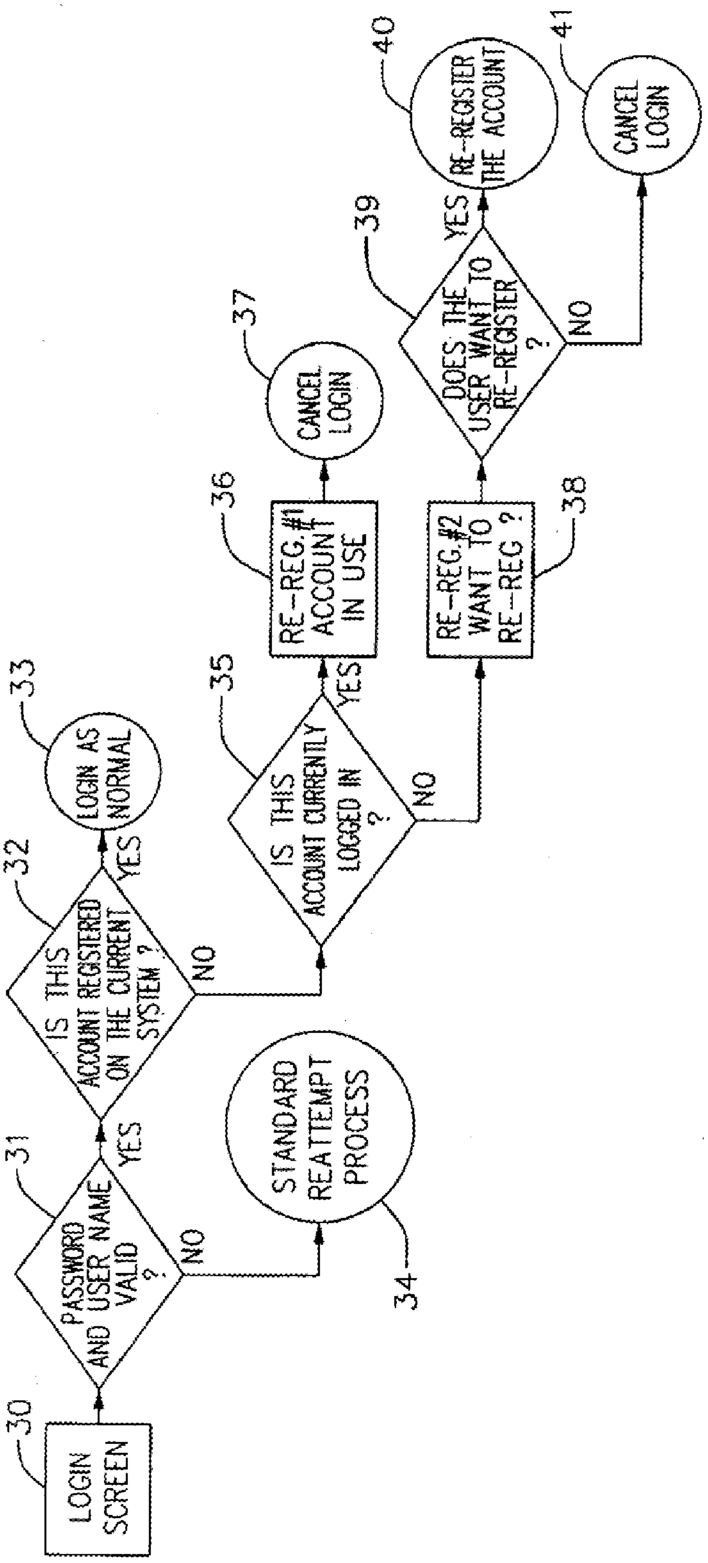
Figure 5A:
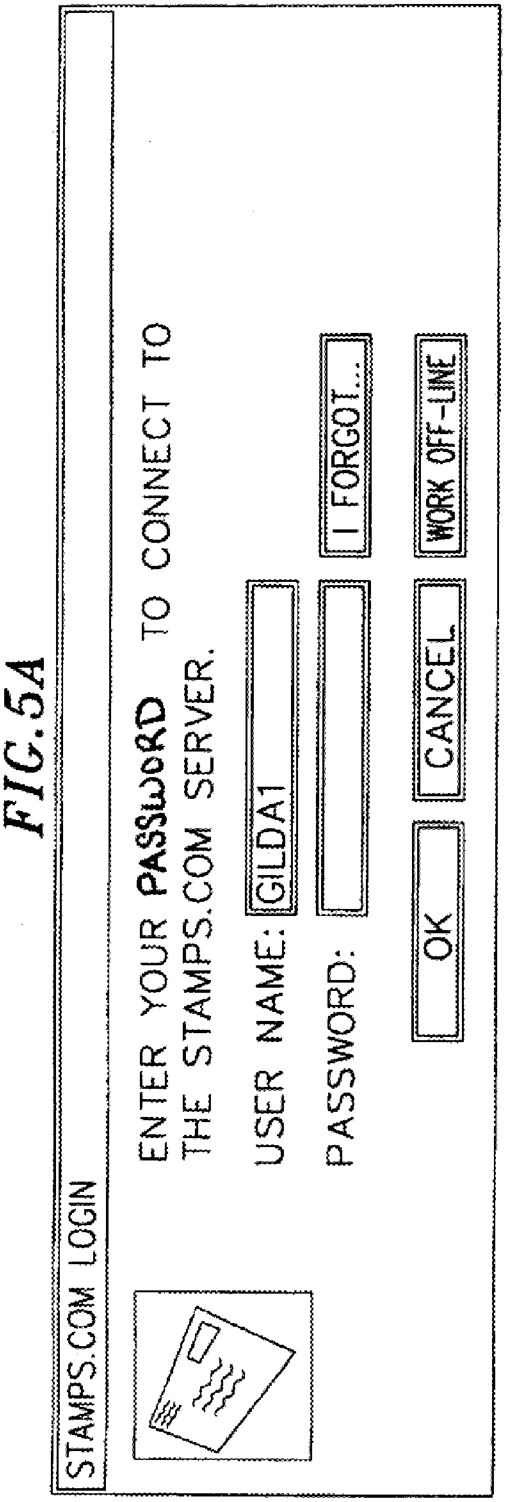
Figure 5B:
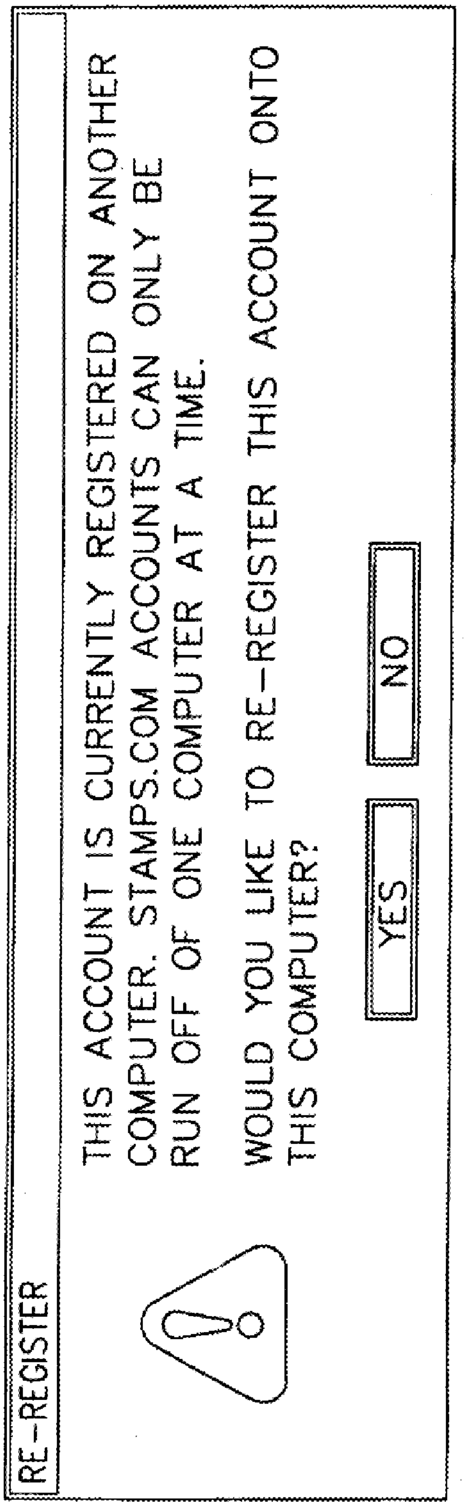

In the case of a postal indicium, the system provides a space within the postal indicium that is designated to display a logo or slogan of the OEM partner or the advertiser, as shown in FIG. 9. The graphic image provided by the OEM partner or the advertiser may be saved in any graphics formats such as Windows Bitmap (BMP), GIF, JPEG, or other graphic formats.

The client server technology of the Internet VBI system enables a provider to provide OEM partners and advertisers with data that tracks the VBI usage of users who are using that OEM's version of the client software. The system embeds a unique OEM identifier within each OEM version of the client software. Once a user has registered with a provider, that user is thereafter associated with the OEM that is identified within their client software. This association, as well as all tracking activities, are transparent to the user and require no additional intervention by the user.

The system can track usage according to several models. The following are some examples of these models:

Number of users who have signed up for the service. This option tracks how many users of a specific OEM version have signed up for any level of service within a particular month.

Number of users who have purchased at least $X in postage. This tracking option identifies the number of users who have purchased at least "$X" in postage since they first established an account with a provider. The amount ($X) is customizable per OEM. This monthly report will only indicate those users who have just passed the defined threshold during the previous month, ensuring that any given user will only appear on a report once.

Number of users who have printed at least $X in postage. This tracks the number of users who have both purchased and printed at least "$X" is postage since establishing an account with a provider. The amount ($X) is customizable per OEM. The monthly report generated from this tracking will only indicate those users who have just passed the defined threshold during the previous month, ensuring that any given user will only appear on a report once.

Number of users who have maintained service for at least X months.

This tracks the number of users who have had a service account maintained continuous with a provider for a minimum period of "X" months. The amount X is customizable per OEM partner. The monthly report tracks only those users who have just passed the threshold period during the previous month, which ensures that a user will only appear on this report once.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for printing a value bearing item (VBI) by a user using one or more computers connected to a computer network, the method comprising the steps of:

registering by the user with an on-line system for printing the VBI;

generating information specific to a first computer used by the user for registering with the on-line system, the information including a first hash message authentication key (HMK);

encrypting the first HMK using a key derived from a user passphrase;

storing the encrypted first HMK on the first computer;

sending the encrypted first HMK from the first computer to a server system;

storing the received encrypted first HMK on the server system;

using a second computer by the user to logon to the on-line system;

detecting that the second computer is missing an HMK;

generating a second encrypted HMK specific to the second computer;

sending the second encrypted HMK to the server system;

requesting the user to provide the user passphrase to the server;

authenticating at the server, the user on the second computer responsive to the passphrase and the second encrypted HMK; and printing the VBI by the user responsive to the authentication of the user by the server.

2. The method of claim 1, further comprising the step of randomly generating the first HMK in a user computer at the time of user registration with the on-line system.

3. The method of claim 1, further comprising the step of encrypting one of the first or second HMK using a Triple DES key derived from a user passphrase.

4. The method of claim 1, further comprising the step of using one of the first or second HMK to sign individual server requests and authenticate the user for each server request.

5. The method of claim 1, further comprising the step of changing one of the first or second HMK on a periodic basis.

6. The system of claim 1, further comprising the step of storing one of the first or second HMK in a secure database remote from the user computer.

7. The method of claim 1, further comprising the step of storing one of the first or second HMK as a part of a user PSD package.

8. The method of claim 1, wherein the step of printing the VBI comprises printing a postage value.

9. The method of claim 1, wherein the step of printing the VBI comprises printing a ticket.

10. The method of claim 1, wherein the step of printing the VBI comprises printing one or more of a coupon, a currency, a voucher, and a check.

* * * * *

UNITED STATES PATENT AND TRADEMARK OFFICE

CERTIFICATE OF CORRECTION

PATENT NO. : 7,251,632 B1
APPLICATION NO. : 09/692747
DATED : July 31, 2007
INVENTOR(S) : Ogg et al.

It is certified that error appears in the above-identified patent and that said Letters Patent is hereby corrected as shown below:

The title page should be deleted and substitute the attached title page.

| | |
|---|---|
| FIG. 1, Sheet 1 of 15 | Delete Drawing Sheet 1 and substitute therefore the Drawing Sheet, consisting of Fig. 1, as shown on the attached page |
| FIG. 2, Sheet 2 of 15 | Delete Drawing Sheet 2 and substitute therefore the Drawing Sheet, consisting of Fig. 2, as shown on the attached page |
| FIG. 4, Sheet 4 of 15 | Delete Drawing Sheet 4 and substitute therefore the Drawing Sheet, consisting of Fig. 4, as shown on the attached page |
| FIGs 5A & 5B, Sheet 5 of 15 | Delete Drawing Sheet 5 and substitute therefore the Drawing Sheet, consisting of Figs. 5A & 5B, as shown on the attached page |

Signed and Sealed this

Eleventh Day of December, 2007

JON W. DUDAS
*Director of the United States Patent and Trademark Office*

(12) United States Patent
Ogg et al.

(10) Patent No.: US 7,251,632 B1
(45) Date of Patent: Jul. 31, 2007

(54) MACHINE DEPENDENT LOGIN FOR ON-LINE VALUE-BEARING ITEM SYSTEM

(75) Inventors: Craig L. Ogg, Long Beach, CA (US); Piers C. Lingle, Santa Monica, CA (US)

(73) Assignee: Stamps. com, Santa Monica, CA (US)

( * ) Notice: Subject to any disclaimer, the term of this patent is extended or adjusted under 35 U.S.C. 154(b) by 545 days.

(21) Appl. No.: 09/692,747

(22) Filed: Oct. 18, 2000

Related U.S. Application Data

(60) Provisional application No. 60/160,708, filed on Oct. 20, 1999, provisional application No. 60/160,491, filed on Oct. 20, 1999, provisional application No. 60/160,040, filed on Oct. 18, 1999, provisional application No. 60/160,038, filed on Oct. 18, 1999.

(51) Int. Cl.

| | |
|---|---|
| *G06Q 99/00* | (2006.01) |
| *G06Q 40/00* | (2006.01) |
| *H04K 1/00* | (2006.01) |
| *G06F 17/00* | (2006.01) |
| *G07B 17/02* | (2006.01) |

(52) U.S. Cl. .............................. 705/62; 705/1; 705/50; 705/60; 705/401; 705/408

(58) Field of Classification Search .................. 705/1, 705/50, 51, 60, 62, 64, 400, 401, 408
See application file for complete search history.

(56) References Cited

U.S. PATENT DOCUMENTS 4,447,890 A 5/1984 Duwel et al. .............. 364/900
4,743,747 A 5/1988 Fougere et al. ............ 235/494
4,831,555 A 5/1989 Sansone et al.

(Continued)

FOREIGN PATENT DOCUMENTS

EP 690417 A2 * 1/1996

(Continued)

OTHER PUBLICATIONS

"Pitney Bowes Showcases Internet Messaging Solutions", Business Wire, Oct. 7, 1998.*

(Continued)

*Primary Examiner*—Calvin L. Hewitt, II
(74) *Attorney, Agent, or Firm*—Christie, Parker & Hale, LLP.

(57) ABSTRACT

An on-line VBI printing system that includes one or more cryptographic modules and a central database. The cryptographic modules are capable of implementing a variety of required security standards. A client system provides a user friendly GUI for facilitating the interface of the user to the system. The GUI system includes wizards that help the user step-by-step with processes of registration, logging into the system, and printing the VBI.

In one aspect, the invention describes an on-line system for printing a value bearing item (VBI) that includes a memory for storing information specific to a first computer used by the user for registering with the on-line system, wherein the information is used by the server system to identify the first computer and a re-registration wizard for requiring the user to re-register if a second computer used by the user is not the same as the first computer used for registering the user.

10 Claims, 15 Drawing Sheets

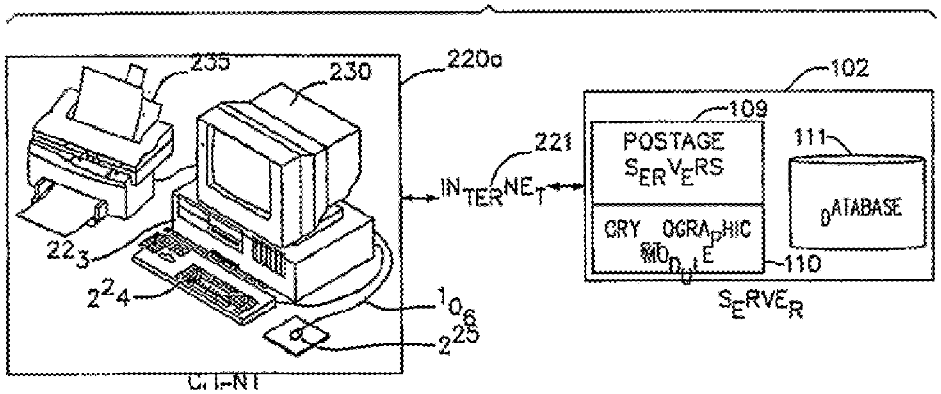

UNITED STATES PATENT AND TRADEMARK OFFICE

CERTIFICATE OF CORRECTION

PATENT NO. : 7,251,632 B1
APPLICATION NO. : 09/692747
DATED : July 31, 2007
INVENTOR(S) : Ogg et al.

It is certified that error appears in the above-identified patent and that said Letters Patent is hereby corrected as shown below:

The title page should be deleted and substitute the attached title page.

| | |
|---|---|
| FIG. 1, Sheet 1 of 15 | Delete Drawing Sheet 1 and substitute therefore the Drawing Sheet, consisting of Fig. 1, as shown on the attached page |
| FIG. 2, Sheet 2 of 15 | Delete Drawing Sheet 2 and substitute therefore the Drawing Sheet, consisting of Fig. 2, as shown on the attached page |
| FIG. 4, Sheet 4 of 15 | Delete Drawing Sheet 4 and substitute therefore the Drawing Sheet, consisting of Fig. 4, as shown on the attached page |
| FIGs 5A & 5B, Sheet 5 of 15 | Delete Drawing Sheet 5 and substitute therefore the Drawing Sheet, consisting of Figs. 5A & 5B, as shown on the attached page |

This certificate supersedes the Certificate of Correction issued December 18, 2007.

Signed and Sealed this

Twenty-ninth Day of January, 2008

Jon W. Dudas

JON W. DUDAS
*Director of the United States Patent and Trademark Office*

US007251632B1

(12) United States Patent
Ogg et al.

(10) Patent No.: US 7,251,632 B1
(45) Date of Patent: Jul. 31, 2007

(54) MACHINE DEPENDENT LOGIN FOR ON-LINE VALUE-BEARING ITEM SYSTEM

(75) Inventors: Craig L. Ogg, Long Beach, CA (US); Piers C. Lingle, Santa Monica, CA (US)

(73) Assignee: Stamps. com, Santa Monica, CA (US)

(*) Notice: Subject to any disclaimer, the term of this patent is extended or adjusted under 35 U.S.C. 154(b) by 545 days.

(21) Appl. No.: 09/692,747

(22) Filed: Oct. 18, 2000

Related U.S. Application Data

(60) Provisional application No. 60/160,708, filed on Oct. 20, 1999, provisional application No. 60/160,491, filed on Oct. 20, 1999, provisional application No. 60/160,040, filed on Oct. 18, 1999, provisional application No. 60/160,038, filed on Oct. 18, 1999.

(51) Int. Cl.
*G06Q 99/00* (2006.01)
*G06Q 40/00* (2006.01)
*H04K 1/00* (2006.01)
*G06F 17/00* (2006.01)
*G07B 17/02* (2006.01)

(52) U.S. Cl. .............................. 705/62; 705/1; 705/50; 705/60; 705/401; 705/408

(58) Field of Classification Search .................... 705/1, 705/50, 51, 60, 62, 64, 400, 401, 408
See application file for complete search history.

(56) References Cited

U.S. PATENT DOCUMENTS 4,447,890 A 5/1984 Duwel et al. .............. 364/900
4,743,747 A 5/1988 Fougere et al. ............ 235/494
4,831,555 A 5/1989 Sansone et al.

(Continued)

FOREIGN PATENT DOCUMENTS

EP 690417 A2 * 1/1996

(Continued)

OTHER PUBLICATIONS

"Pitney Bowes Showcases Internet Messaging Solutions", Businr Wire, Oct. 7, 1998.*

(Continued)

*Primary Examiner*—Calvin L. Hewitt, II
(74) *Attorney, Agent, or Firm*—Christie, Parker & Hale, LLP.

(57) ABSTRACT

An on-line VBI printing system that includes one or more cryptographic modules and a central database. The cryptographic modules are capable of implementing a variety of required security standards. A client system provides a user friendly GUI for facilitating the interface of the user to the system. The GUI system includes wizards that help the user step-by-step with processes of registration, logging into the system, and printing the VBI.

In one aspect, the invention describes an on-line system for printing a value bearing item (VBI) that includes a memory for storing information specific to a first computer used by the user for registering with the on-line system, wherein the information is used by the server system to identify the first computer and a re-registration wizard for requiring the user to re-register if a second computer used by the user is not the same as the first computer used for registering the user.

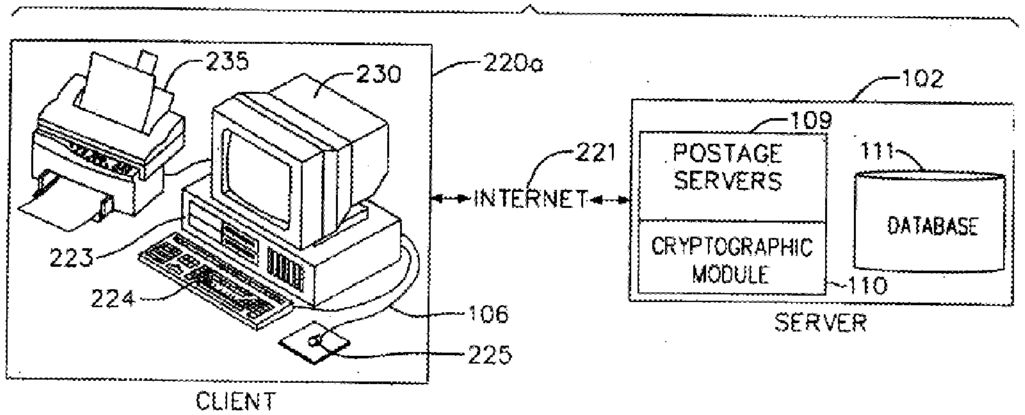

10 Claims, 15 Drawing Sheets